Dec. 22, 1953 A. M. DONOFRIO 2,663,129
MACHINE FOR FABRICATING CAPSULES FROM ELASTIC FILMS
Filed July 18, 1951 19 Sheets-Sheet 1

INVENTOR
ALFONSO M. DONOFRIO
BY
Henry L. Leonard
ATTORNEY

Dec. 22, 1953   A. M. DONOFRIO   2,663,129
MACHINE FOR FABRICATING CAPSULES FROM ELASTIC FILMS
Filed July 18, 1951   19 Sheets-Sheet 2

INVENTOR:
ALFONSO M. DONOFRIO.
BY
Henry L. Leonard
ATTORNEY

Dec. 22, 1953     A. M. DONOFRIO     2,663,129
MACHINE FOR FABRICATING CAPSULES FROM ELASTIC FILMS
Filed July 18, 1951     19 Sheets-Sheet 5

INVENTOR:
ALFONSO M. DONOFRIO.
BY
Henry F. Leonard
ATTORNEY

Dec. 22, 1953  A. M. DONOFRIO  2,663,129
MACHINE FOR FABRICATING CAPSULES FROM ELASTIC FILMS
Filed July 18, 1951  19 Sheets-Sheet 9
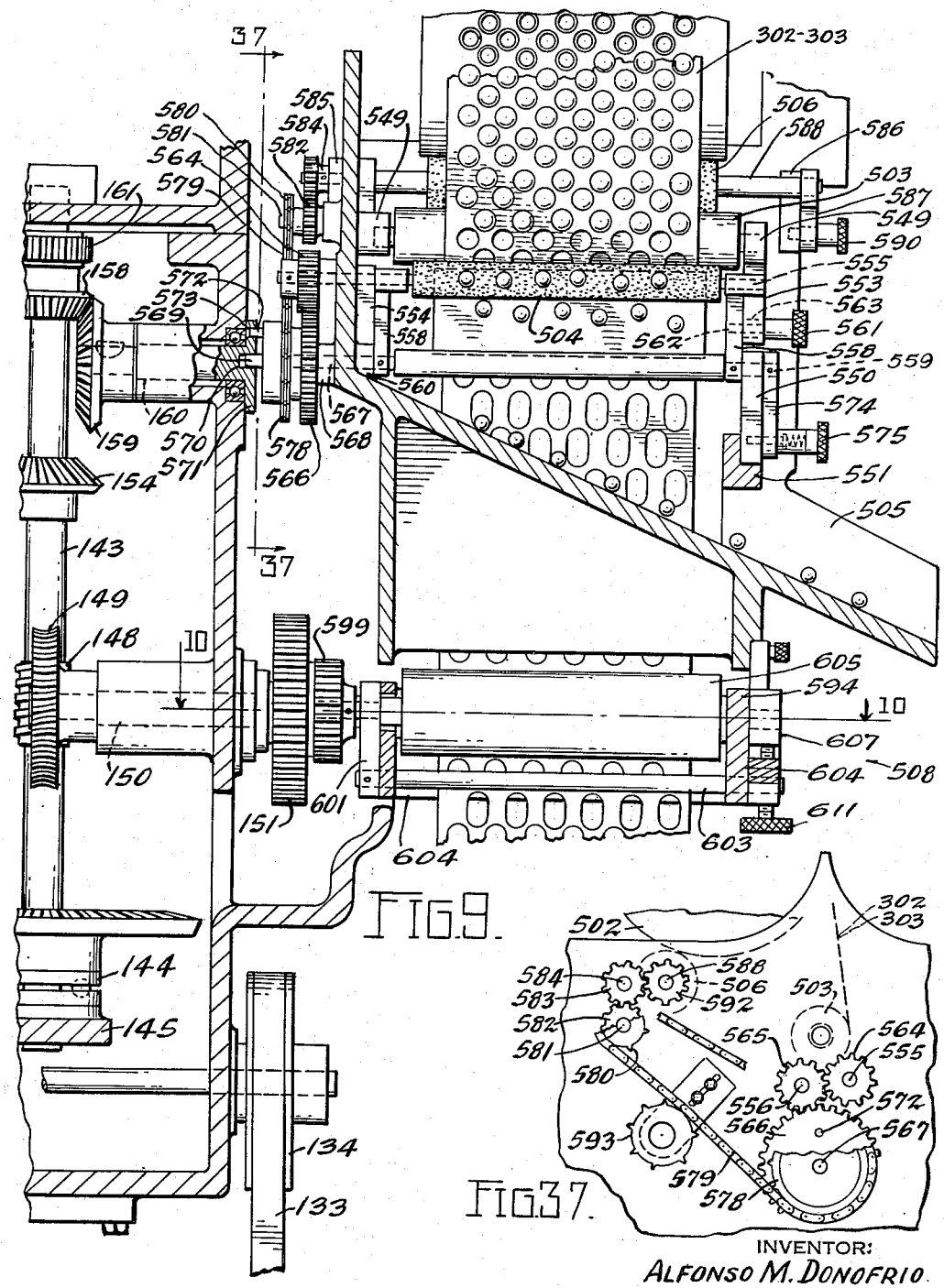
INVENTOR:
ALFONSO M. DONOFRIO
BY
Henry J. Leonard
ATTORNEY

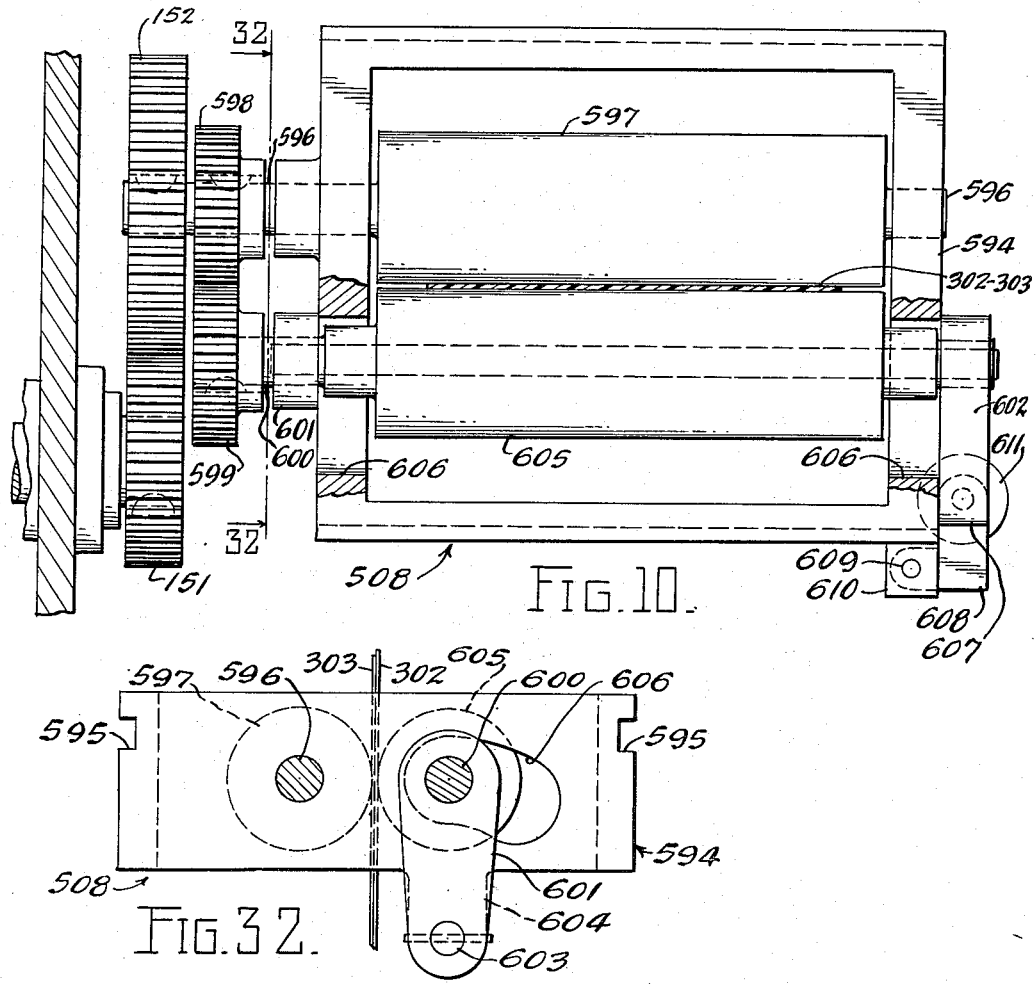
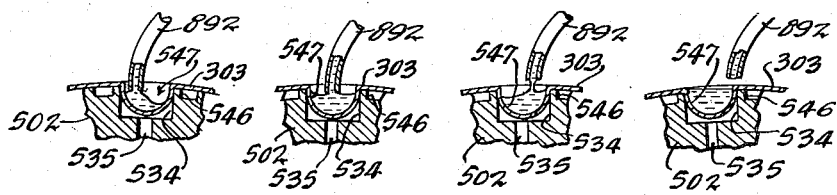
Fig.33. Fig.34. Fig.35. Fig.36.
INVENTOR:
ALFONSO M. DONOFRIO.
BY
Henry J. Leonard
ATTORNEY Dec. 22, 1953  A. M. DONOFRIO  2,663,129
MACHINE FOR FABRICATING CAPSULES FROM ELASTIC FILMS
Filed July 18, 1951  19 Sheets-Sheet 11
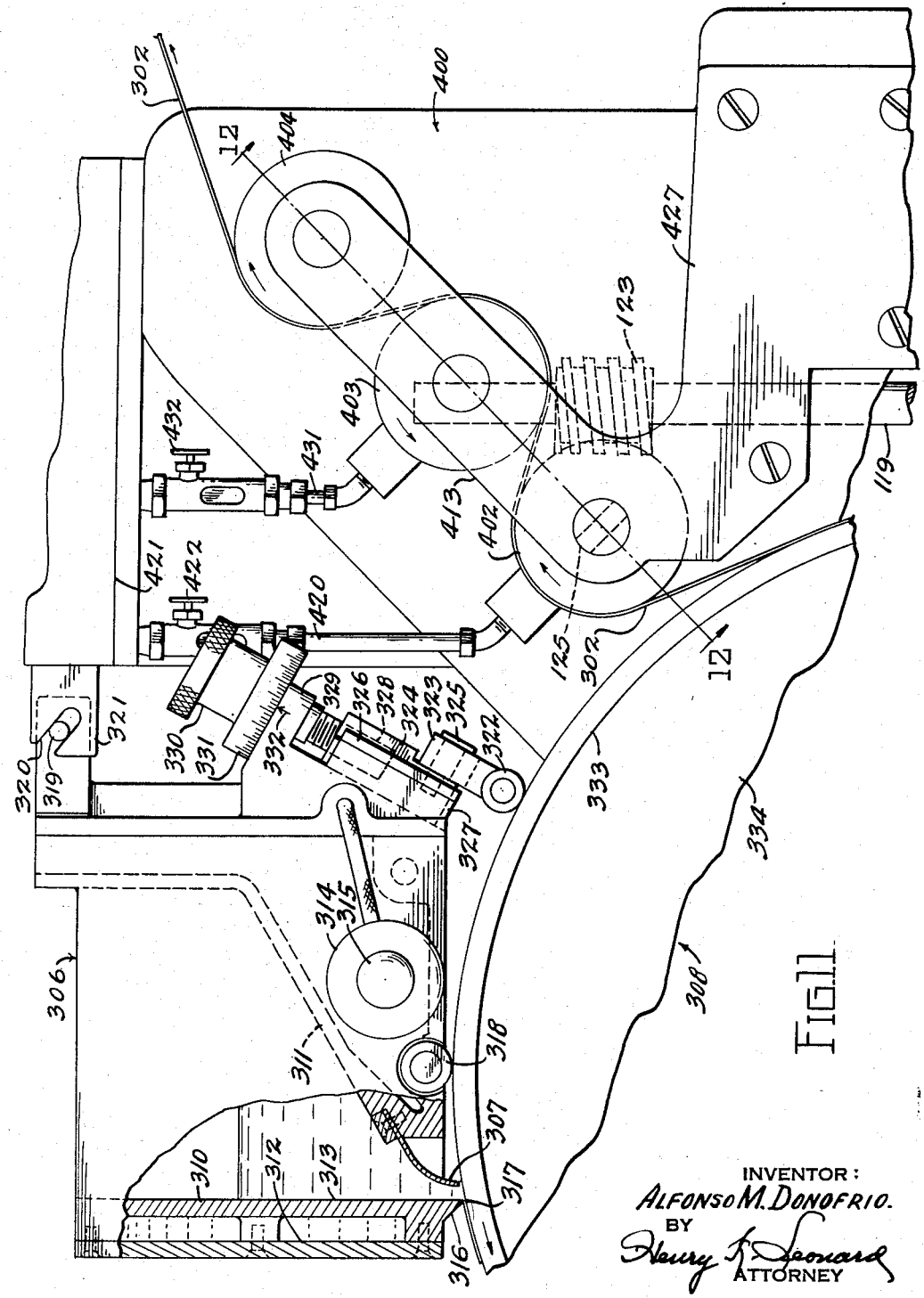

Dec. 22, 1953  A. M. DONOFRIO  2,663,129
MACHINE FOR FABRICATING CAPSULES FROM ELASTIC FILMS
Filed July 18, 1951  19 Sheets-Sheet 12

INVENTOR:
ALFONSO M. DONOFRIO.
BY
Henry Leonard
ATTORNEY

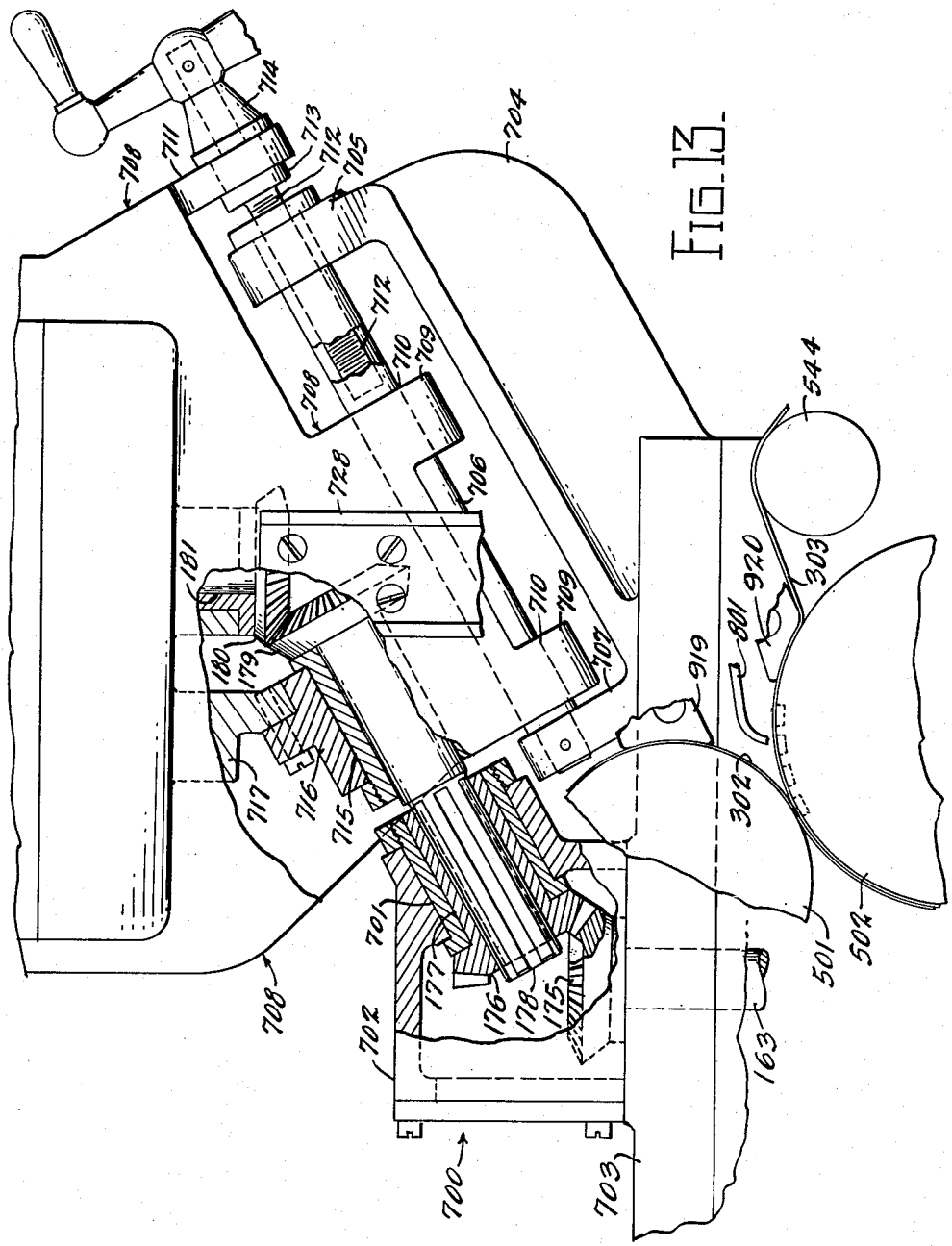

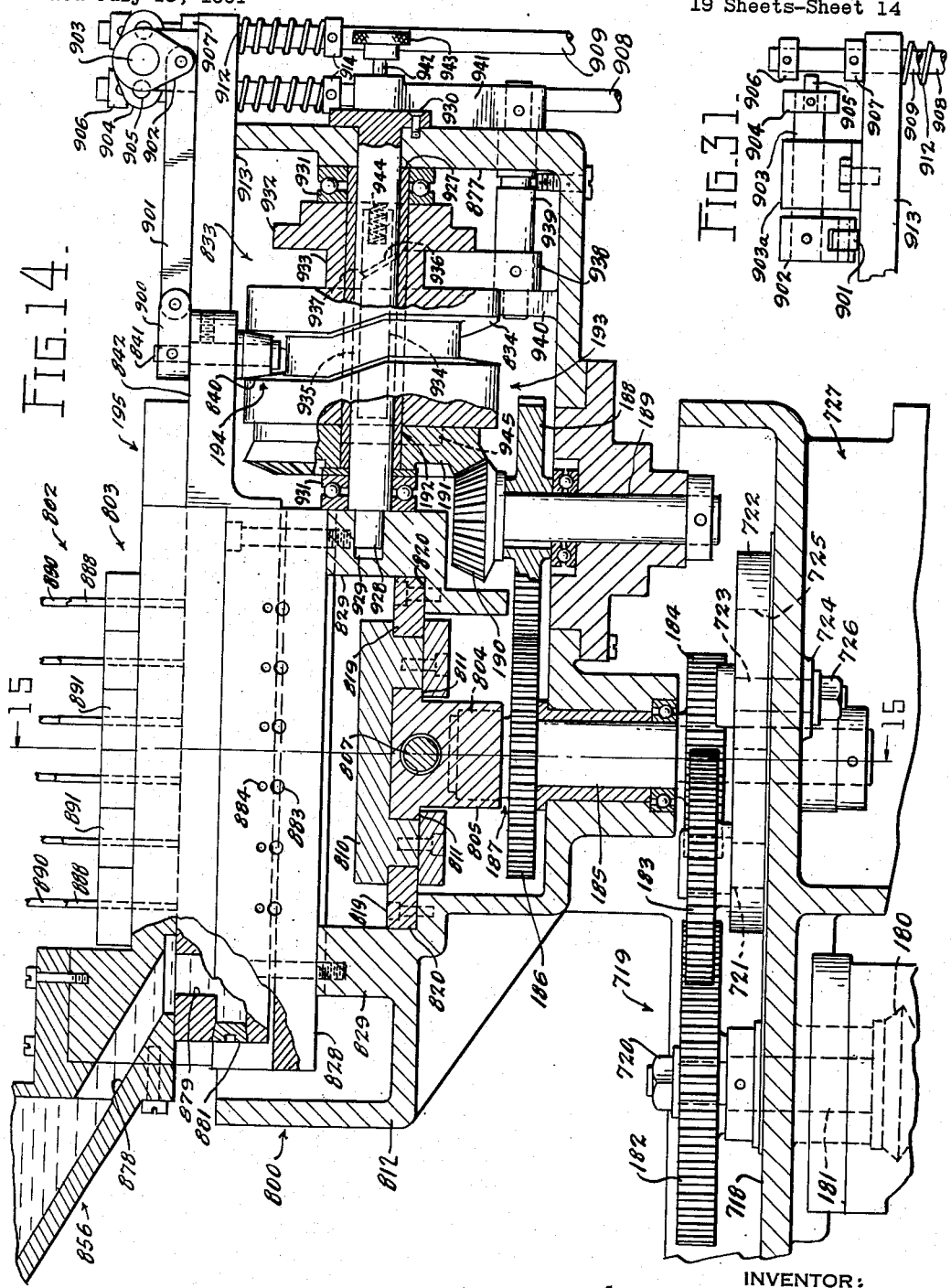

Dec. 22, 1953 A. M. DONOFRIO 2,663,129
MACHINE FOR FABRICATING CAPSULES FROM ELASTIC FILMS
Filed July 18, 1951 19 Sheets-Sheet 15
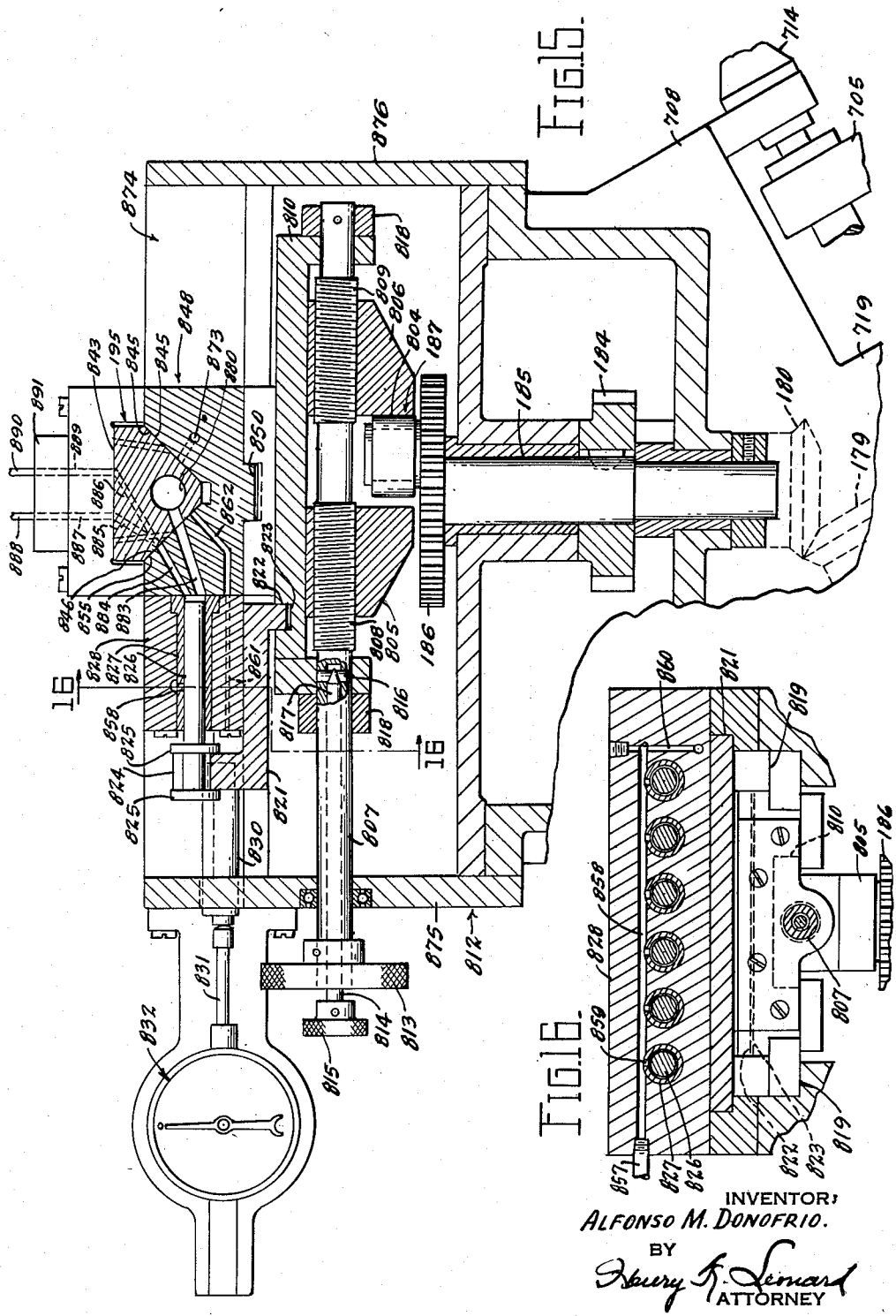
INVENTOR:
ALFONSO M. DONOFRIO.
BY
Henry K. Lemard
ATTORNEY Dec. 22, 1953  A. M. DONOFRIO  2,663,129
MACHINE FOR FABRICATING CAPSULES FROM ELASTIC FILMS
Filed July 18, 1951  19 Sheets-Sheet 16
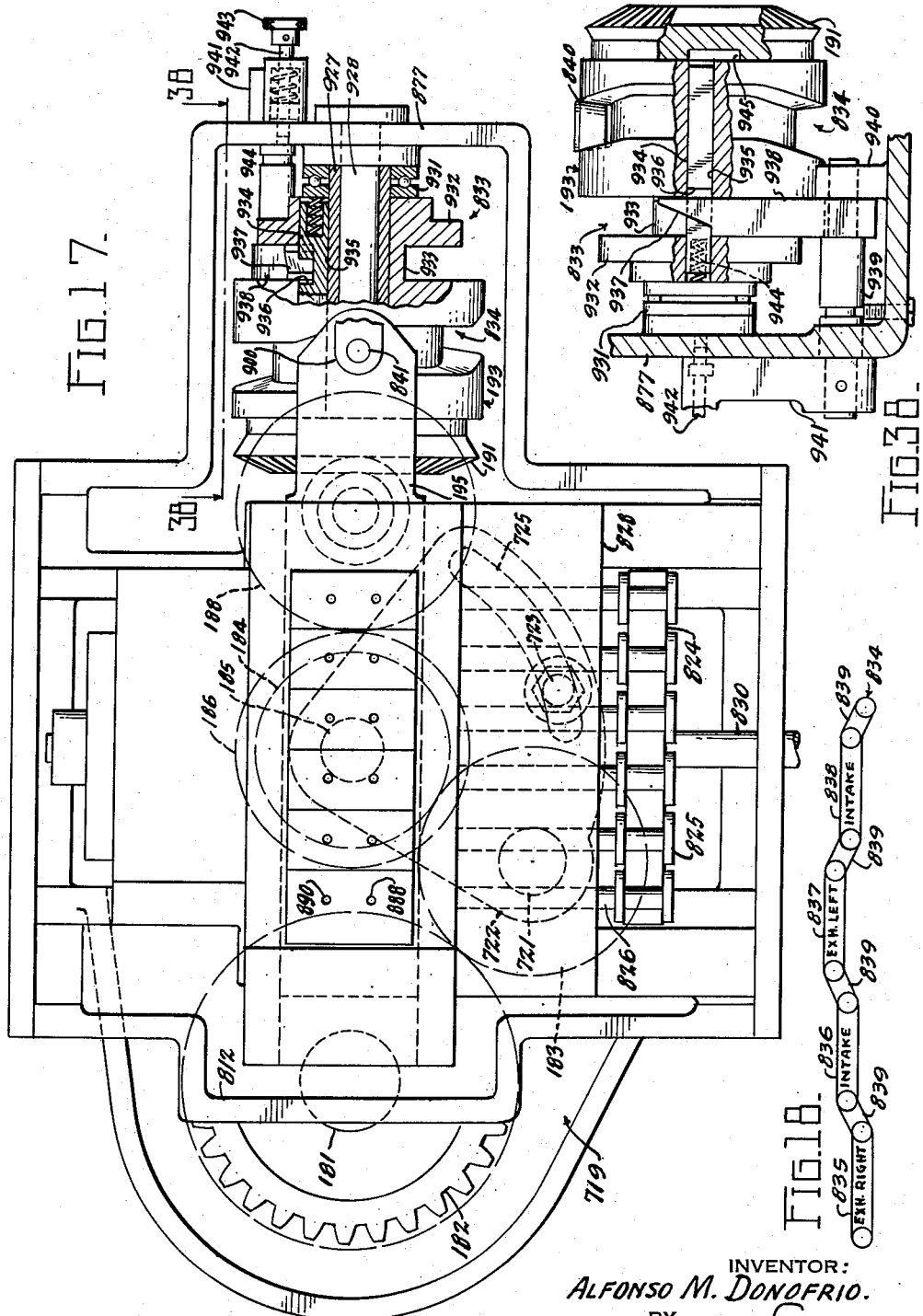
INVENTOR:
ALFONSO M. DONOFRIO.
BY
Henry F. Leonard
ATTORNEY Dec. 22, 1953 A. M. DONOFRIO 2,663,129
MACHINE FOR FABRICATING CAPSULES FROM ELASTIC FILMS
Filed July 18, 1951 19 Sheets-Sheet 17

INVENTOR:
ALFONSO M. DONOFRIO.
BY
Henry K. Leonard
ATTORNEY

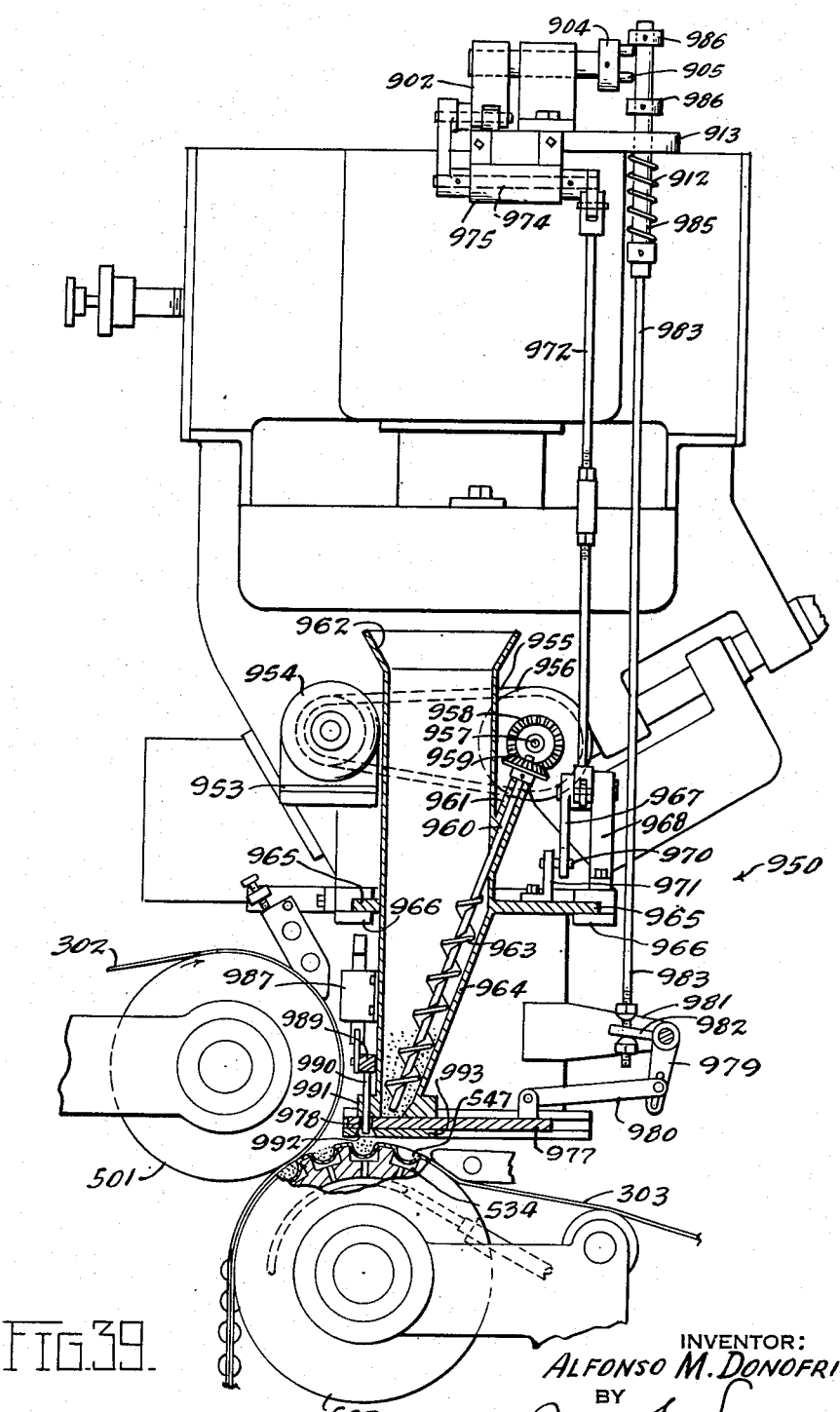

Dec. 22, 1953         A. M. DONOFRIO         2,663,129
MACHINE FOR FABRICATING CAPSULES FROM ELASTIC FILMS
Filed July 18, 1951         19 Sheets-Sheet 19

INVENTOR:
ALFONSO M. DONOFRIO.
BY
Henry L. Leonard
ATTORNEY

Patented Dec. 22, 1953

2,663,129

UNITED STATES PATENT OFFICE 2,663,129

MACHINE FOR FABRICATING CAPSULES FROM ELASTIC FILMS

Alfonso M. Donofrio, Toledo, Ohio, assignor to American Cyanamid Company, New York, N. Y., a corporation of Maine Application July 18, 1951, Serial No. 237,353

22 Claims. (Cl. 53—86)

This application is a continuation-in-part of my copending application Serial No. 126,026 filed November 7, 1949, which application is a division of my copending application Serial No. 718,527, which was filed December 26, 1946 and is now Patent No. 2,513,852 issued July 4, 1950. This application also is a continuation-in-part of my copending application Serial No. 195,967 filed November 16, 1950, now Patent No. 2,624,164.

This application, like its predecessors, has to do with the fabrication of soft substance containing capsules and is principally directed toward apparatus designed for the high speed, commercial production of edible gelatin capsules of the type generally familiar as vitamin capsules for the administration of carefully measured dosages of various pharmaceuticals and medicines and also for the production of similar articles fabricated from other elastic films for containing miscellaneous products such as small amounts of liquids, pastes and powdered materials other than pharmaceuticals and medicines, for example, small amounts of spot removing fluid, such as carbon tetrachloride, or lubricating oil or insect repellent. In general, elastic films may be employed in a machine embodying the invention for the fabrication of capsules containing any desired liquid, paste, or powder or other substance capable of transmitting hydrostatic forces which is compatible with elastic film in which it is enclosed.

Many machines of the prior art have been developed for the fabrication of such articles of commerce, but in almost all of such machines the capsules themselves have been formed from two symmetrical pocketed portions of the enclosing film such as edible gelatin. In these machines the most customary type of operation consists in the use of two matching die rolls in the periphery of each of which are hemispherical or cylindrical die pockets. The capsules are formed by spreading the elastic or stretchable material over the surfaces of the die rolls and either mechanically depressing the material into the pockets or dies or pulling it thereinto by suction applied to its underside. In any event, after the two sheets of encapsulating material are deformed into the matching die pockets, the substance to be encapsulated is deposited either in one or both of the die pockets and the two matching half capsule depressions in the two sheets of encapsulating film are placed in registry with each other and the film sealed around the edges of the hollow generally spherical body thus formed.

Regardless of the means employed for forcing the gelatin or other stretchable film into the opposed matching die pockets and regardless of the means employed for depositing a measured dose or quantity of the substance to be encapsulated, the problems engendered by the necessity for maintaining the opposed die pockets in perfect registry and for depositing the substance to be encapsulated so that it remains in place as the gelatin or film is closed around it, are numerous and extremely difficult to overcome.

Many of the difficulties encountered in this more conventional form of operation can be observed in inspecting the numbers of prior art patents which have been issued and these problems frequently arise from the fact that most substances which are commercially purveyed in capsule-form containers are extremely expensive and thus any wastage of content material (if existing in more than a fraction of a percent of the total quantity being encapsulated) may increase the cost of operation to such an extent as to render the machine commercially not acceptable. This is particularly true where the two sheets of encapsulating film are first pocketed and then passed through or beneath a general pool of the substance to be encapsulated. Under these conditions considerable quantities of the substance may be trapped between the sheets of encapsulating film in the areas adjacent and between the pocketed portions of the film which form the desirable capsules. Thus, the web or remaining portion of the encapsulating films out of which the capsules are punched, as it were, may actually consist in a continuous grid of enclosed passageways containing large quantities of expensive substance to be encapsulated. When this web of encapsulating film is disposed of, either by remelting (if it is thermoplastic as most such films are) or by direct disposal, the substance trapped in the web is lost.

This same principal problem of cost due to loss of expensive substance being encapsulated exists in other machines of the prior art where dosages are forced under pressure between sheets of encapsulating film during or immediately just prior to the final closure of the two sheets of film between the matching lips of die pockets in mated die rolls. The pressure may cause the substance to penetrate between the sheets of capsulating film adjacent the edges of the capsules to be formed before the two opposed films are adequately sealed to each other. This causes loss of substance in the web as above explained and, furthermore, by leaving a minute thread of the substance across the zones immediately surrounding the pockets in the capsulating film, may cause "leakers," i. e., capsules not perfectly sealed around their perimeters and which allow the encapsulated substance to escape.

A further problem existing in all machines where mated substantially identical die pockets are employed in the manner above set forth, is the control of the amount of tension present in the two sheets of encapsulating film forming the opposite sides of finished capsules either by the degree of stretch imparted to the film during fabrication (most such films being highly elastic) or by the ingredients or prior thermal, chemical or physical histories of the encapsulating films. Unless a nice balance is kept between the many characteristics of the two sheets of film employed for forming opposite sides of the capsules, the physical reactions between the two sheets of film after they are enclosed around the encapsulated substance will result in distorting the finished shape of the capsules making them asymmetrical and detracting from their commercial sales appeal. It is a strange vagary in commercial sale of such substance that although asymmetrical capsules contain dosages identical to those contained in more perfectly formed capsules, the buying public is highly reluctant to purchase capsules that are not symmetrical with their mating lines lying in their median planes.

It is the object of the instant invention to provide an apparatus for the carrying out of a novel process disclosed and claimed in my issued Patent 2,513,852 for the fabrication of capsules from elastic encapsulating film such as, for example, edible gelatin, in which pockets are formed in only one of a pair of sheets of such film and the films have such prior preparation as to result in the pocketed film transmitting through the substance encapsulated between the two sheets such forces as will cause the other of the two sheets to be bulged after the sheets are sealed together around the substance to form a symmetrical, generally ellipsoidal capsule.

It will be appreciated that, as is more clearly apparent in my Patent 2,513,852, the term "generally ellipsoidal" includes spheres, ellipsoids, oblate spheroids and other solids of rotation of circles and ellipses on either of their axes, the precise shape of the finished capsule depending not only upon the particular shape of the die pocket into which one of the encapsulating films is deformed to receive a charge of substance, but also the degree of its deformation, the relative treatment of the two sheets of film and the amount, and to a lesser degree the nature, of the substance being encapsulated.

Other objects of the instant invention include the provision of means for the measuring and depositing in controlled variable timing of precise charges of the substance to be encapsulated; the fabrication and treatment of the sheets of encapsulating film; the control of relative timing between the progression of the encapsulating film onto the die roll, the rotation of the die roll and the deposit of the substance to be encapsulated; and the removal and collection of the filled and formed capsules after their fabrication.

Many of the elements of the machine as described in the specification and in the drawings attached hereto might be isolated and removed from the machine of which they form a part and employed to advantage in other similar machines, but this application is intended to set forth a complete operable machine in which all elements necessary for the commercial fabrication of soft capsules are described and associated.

In the drawings attached hereto:

Fig. 9 is a fragmentary vertical sectional view taken substantially on the line 9—9 of Fig. 8.

Fig. 10 is a horizontal sectional view on an enlarged scale taken substantially on the line 10—10 of Fig. 9.

Fig. 11 is a greatly enlarged fragmentary view in elevation of the left-hand portion of the machine illustrated in Fig. 1 and showing mechanism for the formation and treatment of a sheet of encapsulating film.

Fig. 13 is a fragmentary vertical view in elevation and on an enlarged scale of mounting and driving means for the substance measuring and depositing pump shown at the upper center portion of Fig. 1.

Fig. 14 is a vertical sectional view of a substance measuring and pumping unit.

Fig. 15 is a fragmentary vertical sectional view taken substantially on the line 15—15 of Fig. 14.

Fig. 16 is a fragmentary vertical sectional view taken substantially on the line 16—16 of Fig. 15.

Fig. 17 is a plan view with certain parts broken away of the mechanism shown in Fig. 14.

Fig. 18 is a development of the track of a cam included in the mechanism shown in Figs. 14 through 17 for the operation of a main pump valve.

Fig. 19 is a plan view of the main pump valve controlled by the cam referred to.

Fig. 21 is an end view in elevation.

Fig. 29 is a fragmentary detailed view on a greatly enlarged scale of one of the substance depositing nozzles.

Fig. 30 is a fragmentary developed plan view of a portion of the die roll of the machine.

Fig. 31 is a fragmentary front view in elevation of a portion of the mechanism shown in Fig. 14.

Fig. 32 is a vertical sectional view taken on the line 32—32 of Fig. 10.

Fig. 33 is a fragmentary sectional view of a single pocket being filled at an early point in the filling cycle.

Figs. 34, 35, 36 are figures similar to Fig. 33 and showing successive points in the filling cycle.

Fig. 37 is a fragmentary view in elevation taken from the position indicated by the line 37—37 of Fig. 9.

Fig. 38 is a fragmentary view in elevation with parts broken away, taken on the line 38—38 of Fig. 17.

Fig. 39 is a front view in elevation with parts broken away of mechanism for measuring and depositing measured charges of pulverulent material in capsules.

GENERAL DESCRIPTION

Figure 1:
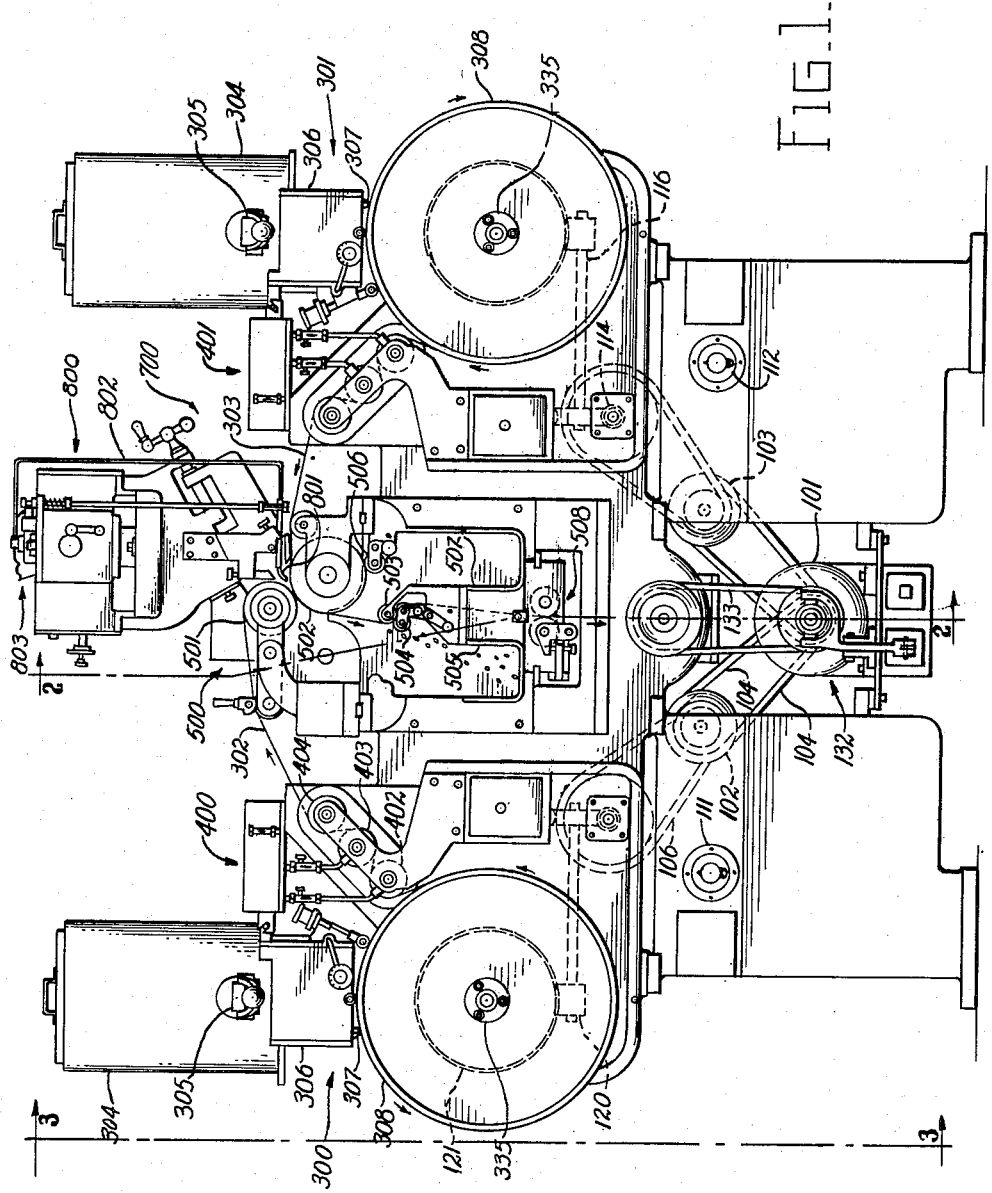
Fig. 1 is a front view in elevation on a small scale of an encapsulating machine embodying the invention and showing all of its necessary elements.

An encapsulating machine embodying the invention is shown in front elevation in Fig. 1. For purposes of convenience in description and reference, the machine generally shown in Fig. 1 will be broken into operative units throughout the following description. The capsulating machine comprises, among other units and parts, a main column 100 which supports the operating elements of the machine and a driving motor 101 that supplies motive power through belting and gearing (which will be more specifically described with reference to Fig. 4) for actuating the several operating elements and units of the machine. These units include an encapsulating film forming unit 300 at the left side of the machine as indicated in Fig. 1 and an identical, though reversed, unit 301 at the right side of the machine. Each of the capsulating film forming units 300 or 301 has closely associated with it a film treating unit 400 or 401 respectively.

The two continuous sheets of encapsulating film 302 and 303 formed on the units 300 and treated by the units 400 are brought together and fabricated into capsules by a capsule forming unit 500 located generally centrally of the machine and physically supported near the upper end of the main column 100.

The substance to be encapsulated is supplied in measured charges and deposited in position to be encapsulated by a pump generally indicated at 800, which is supported, driven and adjustably mounted by a pump mounting and driving unit 700.

The general method of operation of the machine and the detailed description of the various elements and units of the machine will be made as the machine is constructed and operated for the production of edible capsules formed from gelatin film with liquid, semi-liquid or paste substance.

In describing the operation of the machine only one of the two film forming units 300 or 301 will be described because the operation of the two units is identical, the only difference being, of course, that they are opposed in their location and, consequently, the rotation of the various drum and roll-like elements both of the forming units 300 and the treating units 400 are reversed from those pertaining in the forming unit 301 and treating unit 401.

Thermoplastic edible gelatin is loaded into a heated supply tank 304 and allowed to flow from the tank under the control of a valve 305 into the open upper end of a heated spreader box 306. The temperature of the gelatin in the box 306 is closely controlled so that a thin film-like stream of molten gelatin flows from beneath a doctor blade 307 onto the generally cylindrical surface of a rotating casting drum 308 driven, through mechanism to be described, by the motor 101. The casting drum 308 is rotated at such speed that by the time the gelatin film has travelled almost around the periphery of the drum 308 it has solidified to an extent such that it assumes integrity as a film and has become highly elastic with a tacky surface.

The film is then led off the drum 308 and onto the first roll of three rolls 402, 403 and 404 constituting the principal operating parts of the film treating unit 400.

From there the gelatin film 302, now appropriately treated and conditioned for capsulating, passes toward the center of the machine where it engages the periphery of a sealing roller 501 in the capsule forming unit 500. Similarly, the other gelatin film 303, after leaving the right-hand film treating unit 401, is led over the surface of a die roll 502. The film 303 is depressed into the dies in the die roll 502 forming pockets in the film and, as the pocketed film approaches the intersection between its path and the path of the covering film 302, a charge of substance to be encapsulated is deposited in each deformation formed in the film 303. Each charge for each pocket in the film 303 is deposited therein by one of a bank of nozzles 801. Each of the nozzles 801 is connected to a flexible pump lead 802 coming from a dispersion manifold 803 located at the top of the pump 800.

Immediately after a charge of substance to be encapsulated is deposited in a depression in the gelatin film 303, the film 303 is carried between the peripheries of the pressure roller 501 and the die roll 502 where the covering sheet of gelatin 302 is pressed downwardly over the top of the filled pocket in the sheet 303 and sealed to that sheet around the periphery of the pocket. The two sheets 302 and 303 now form an integral web having a plurality of spaced "half-capsules" protruding on that side of the gelatin sheet 303 opposite the sheet 302, each closed capsule being generally semi-ellipsoidal in shape and fitting into a pocket in the die roll 502.

Because of the treatment of the two sheets 302 and 303, as will subsequently be described, the sheet 303 after it is pocketed has greater internal stresses than the sheet 302. As the web made up of the two sheets 302 and 303 leaves the die roll 502 its release from the die roll 502 allows the greater stresses in the sheet 303 to transmit force through the substance encapsulated (which, as explained, is capable of transmitting hydrostatic force, and to the sheet 302. The balancing of the unequal stresses between the sheets causes the closed, generally semi-ellipsoidal capsule to change shape, assuming its final symmetrical ellipsoidal form so that by the time the web reaches a breakout roller 503 the capsules have become symmetrical. As the web is bent around the roller 503, the capsules are flicked out of the web 302—303 by a counter-rotating brush 504 rotated on an axis parallel to the axis of the breakout roller 503. The capsules thus formed tumble downwardly through a chute 505 into containers placed for their reception. Any capsules which may cling to the die roll 502 and not be lifted from the die pockets therein when the web 302—303 leaves the die roll 502, are brushed out of these pockets by a supplementary die roll brush 506 and tumble down a second chute 507 also leading to trays or baskets for their collection.

After the web 302—303 has passed between the breakout roller 503 and brush 504, it is led downwardly between a pair of pulling rollers 508 which rotate at a linear speed faster than the linear speed of the die roll 502 and pressure roller 501, thus maintaining tension on the web 302—303 and assisting in popping out the capsules. The pulling rollers 508 feed the web downwardly to a conveniently located container so that the web of thermoplastic encapsulating material, in this case edible gelatin, may be poured back into the tank 304 and remelted or otherwise disposed of.

Control over the shape of the finished capsules insofar as the degree to which the greater stresses in the gelatin sheet 303 react on the lesser stressed sheet 302, is accomplished in the embodiment of the invention shown in the drawings by controlling the linear speed of rotation of the sheet forming units 300 and 301 and the two gelatin treating units 400 and 401 relative to the linear speed of the capsule forming unit 500. This speed relationship is controlled by speed change mechanisms 102 and 103 which are engaged by belts 104 and 105 driven by the motor 101, and by driven belts 106 and 107, which are in turn engaged with pulleys 108 and 109, respectively. The belts 106 and 107 are input elements of the gear train that drives the casting drum 308 and the rollers 402, 403 and 404.

By correctly setting the two speed change mechanisms 102 and 103, the linear speeds of the two gelatin film forming apparatuses and treating apparatuses can be so related as to impart greater stretch to the film 303, for example, than to the film 302. On the other hand, if the chemical constituents of the two gelatin films are properly and separately established it may be desirable in some cases originally to impart greater stresses to the film 302 than to the film 303 in which case the speed change mechanisms 102 and 103 may be actuated to create such stresses by more greatly stretching the film 302 longitudinally during its formation and treatment. The greater longitudinal stretching of one film with respect to the other is accomplished by reducing the linear speed of its formation and treatment relative to the linear speed of the sealing roller 501 and die roll 502 where the films are associated together to form the web 302—303. Under certain conditions, therefore, the stresses in the covering film 302 may be greater than in those in the film to be pocketed 303 before pocketing, but the pocketing of the film 303 introduces additional stresses in that film so that under all circumstances the film 303 after pocketing is more greatly stressed than the film 302 which merely is laid over the top of the filled pockets formed in the film 303. Therefore, by appropriately balancing the degree of stretch introduced into the two films 302 and 303 prior to pocketing the film 303; by varying the constituents of the films and compensatingly varying their stretch; or by combinations of these various treatments; the films are appropriately established with proper stresses so that the unbalanced forces existing at the time the capsules are sealed around the substance are balanced out subsequent to sealing in changing the shape of the sealed capsules from generally semi-ellipsoidal (for example, hemispherical) to symmetrical, ellipsoidal shapes, for example, spheres or ellipsoids.

In summary, reference numbers will be applied to the elements of the several main units in series as follows:

100—main column and general transmission, including gear train leading up to, but usually not including, elements beyond the gear train in each of the units.
300—encapsulating film forming units.
400—encapsulating film treating units.
500—capsule forming and film handling unit.
700—pump mounting and driving unit.
800—capsule content pumping and depositing unit.

MAIN DRIVE

Figure 2:
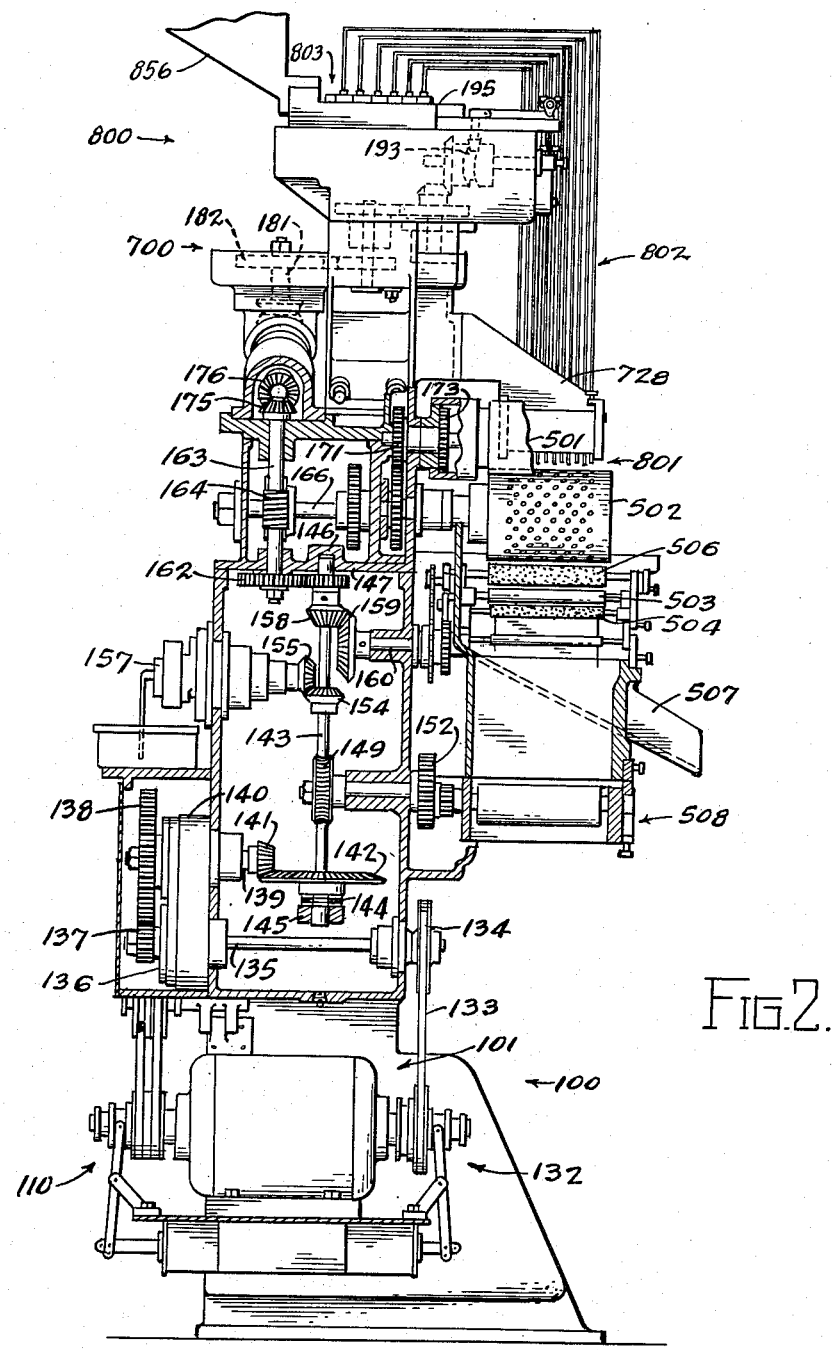
Fig. 2 is a fragmentary vertical sectional view showing portions of the machine in elevation and taken from the position indicated by the line 2—2 of Fig. 1, certain parts being broken away for clarity.

The motor 101 (see Figs. 1, 2 and 4) has a double ended drive shaft on the rear end of which are located a pair of driving pulleys 110 in which are engaged the two driving belts 104 and 105 that serve as inputs to the two speed change mechanisms 102 and 103. The speed change mechanisms, which may be conventional telescoping V-belt type, are controlled by hand wheels 111 and 112 (see Fig. 1) having cooperating indices by means of which settings of the speed change mechanisms which produce certain results may be read and reproduced.

The two driven belts 106 and 107, as explained, are engaged with driven pulleys 108 and 109. Each of the pulleys 108 and 109 is secured on the end of a fore-and-aft jackshaft 113 to the forward end of which there is pinned or keyed a worm 114 that in turn meshes with a worm gear 115 secured on the inner end of a longitudinal shaft 116. The longitudinal shaft 116 carries a bevel gear 117 near its innermost end which is meshed with a similar gear 118 secured on the lower end of a vertical drive shaft 119 for the film treating unit 400.

The outboard end of the longitudinal shaft 116 carries a worm 120 which is in mesh with a worm wheel 121 secured at the rear of a forwardly projecting stub shaft 122 on which the casting drum 308 is removably mounted.

The vertical drive shaft 119 for the film treating unit 400 has a worm 123 pinned to its upper end which worm is engaged with a worm gear 124 keyed at the rear end of a stub shaft 125 for the roller 402. The shaft 125 also carries a spur pinion 126 that meshes with a similar pinion 127 keyed on the rear end of a second shaft 128 for the roller 403, the pinion 127 in turn being meshed with a pinion 129 that is secured to the rear of a third forwardly extending shaft 130 on which the third roller 404 is mounted. (See Figs. 11 and 12 and the section below entitled "Film treating unit" for a more complete description of this construction.)

Figure 4:
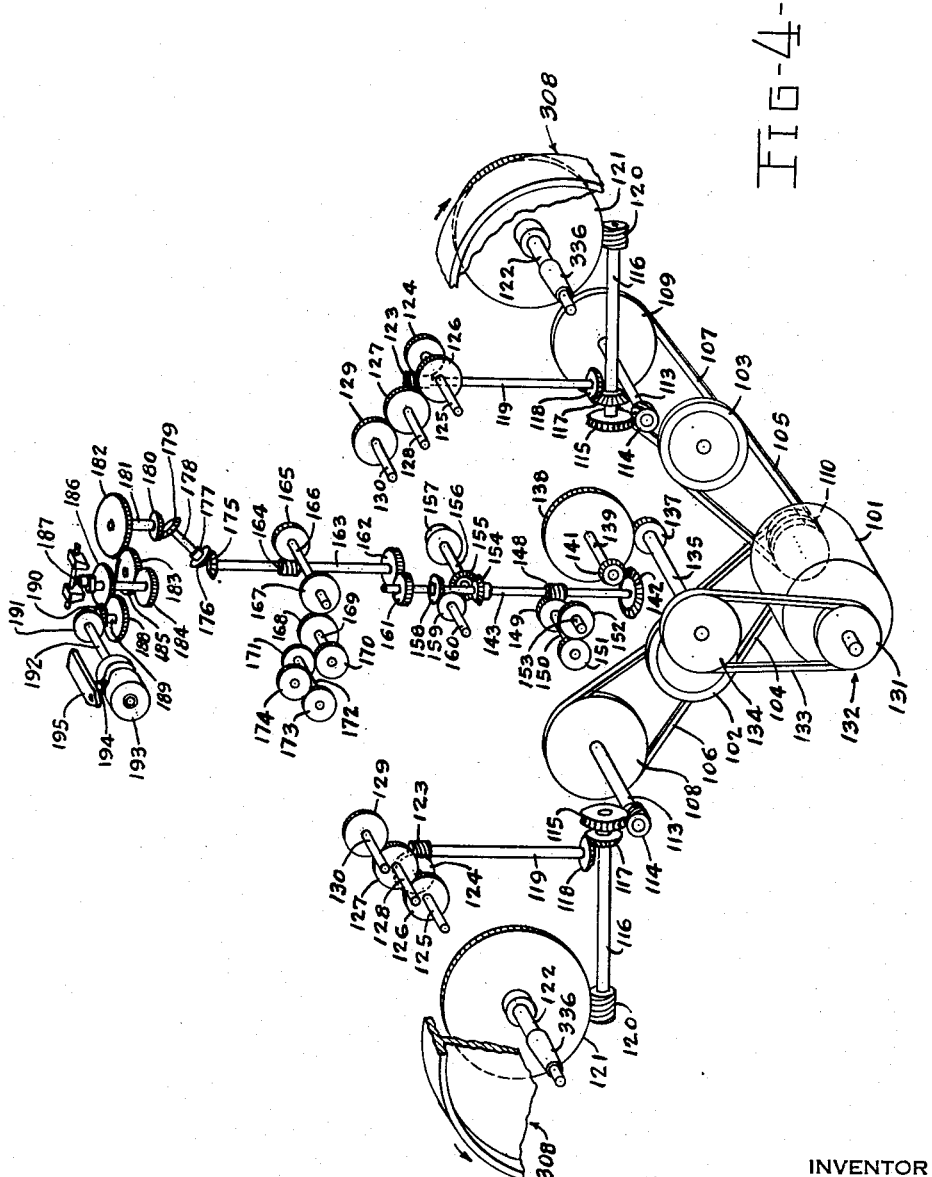
Fig. 4 is a schematic isometric drawing showing the driving mechanism for a machine embodying the invention including the various gear trains, drive shafts, etc., by which power is progressed through the machine and by which relative speed adjustments and relationships are established.

It should be observed at this point that the driving mechanisms for the two casting drums 308 and the two film treating units 400 and 401 are identical and thus corresponding bearings and framing members exist on each side of the machine for supporting the elements in the relationships shown in Fig. 4. The mechanisms also are separate (operatively and in the train of power) from the remaining driving mechanism of the machine and, therefore, any changes made in the relative speeds of the two film forming and film treating units do not introduce compensating differences in speed in the operation of the capsule forming or pump driving units of the machine.

The main power train originates at a pulley 131 which is mounted upon the driven member of a clutch 132 that in turn is carried on the forward end of the shaft of the motor 101. Declutching the clutch 132 permits the gelatin forming portions of the apparatus to be operated without operating the center upper units of the machine for forming capsules or pumping content material.

A belt 133 is engaged in the pulley 131 (see also Fig. 2) and is also engaged in a pulley 134 pinned on the forward end of a fore and aft jackshaft 135. The rear end of the shaft 135 is journalled in a bearing 136 (see Fig. 2) mounted on the rear wall of the main column 100 of the machine and carries a removable pinion 137 at its rearmost end. The pinion 137 and a meshing gear 138 that is removably secured to the rear of a stub shaft 139 (journalled in a companion bearing 140 also carried by the main housing wall) constitute a "pick-off" set of gears that can be changed to vary the speed of rotation of the capsule forming and filling mechanisms in accordance with the number and size of the die pockets therein, i. e., depending upon the volume of each of the capsules to be formed, there being fewer pockets in a die roll designed for large volume capsules than in one designed for small volume capsules.

A bevel pinion 141 is pinned on the forward end of the stub shaft 139 and is in mesh with a bevel ring gear 142 secured in turn near the lower end of a vertically extending drive shaft 143. The drive shaft 143 is journalled in a load supporting bearing 144 carried in an ear 145 formed on the column 100 and in an upper bearing 146 that is carried by a web 147 extending across the top of the casting for the main column 100.

A worm 148 which is pinned on the main drive shaft 143 near its center is in mesh with a worm gear 149 that is secured on the rear end of a forwardly extending shaft 150 for driving the two pulling rollers 508. A spur pinion 151 mounted on the forward end of the shaft 150 is in mesh with a similar pinion 152 that is secured on the rear end of a pulling roller shaft 153 for the pulling rollers 508. (For a more complete description of the drive between the pulling rollers 508, see Figs. 10 and 32 and the description thereof in the section of this specification covering the capsule forming unit 500.)

Further up the main drive shaft 143 there is pinned a bevel pinion 154 that is in mesh with a similar pinion 155 secured in turn on the forward end of a pump shaft 156 which drives an oil pump 157 mounted at the rear of the machine for circulating lubricating oil to the capsule content pumping mechanism yet to be described.

At the upper end of the vertical drive shaft 143 there is pinned a bevel pinion 158 which is meshed with a larger bevel gear 159 secured on the inner end of a forwardly extending shaft 160 that drives the breakout roller 503 and its associated parts. (For a further description of this mechanism see Figs. 9 and 37 and the section of the specification pertaining to the capsule forming unit 500.)

Figure 6:
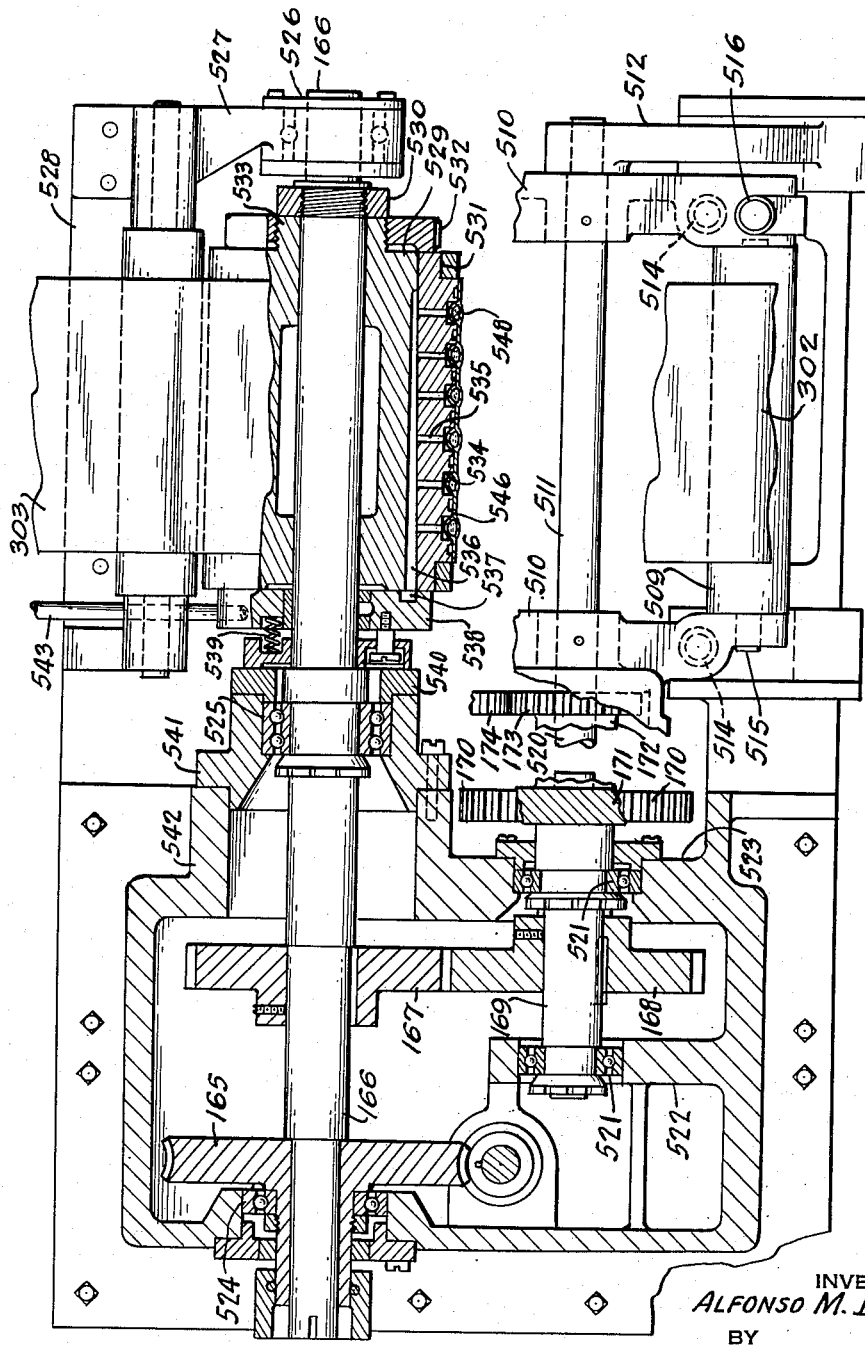
Fig. 6 is a fragmentary horizontal sectional view taken substantially on the line 6—6 of Fig. 5.

The uppermost end of the vertical drive shaft 143 carries a spur pinion 161 which is in mesh with a spur gear 162 secured on the lower end of a rearwardly spaced vertically extending shaft 163. The shaft 163 carries a worm 164 which is in mesh with a worm gear 165 driving a die roll shaft 166 (see also Fig. 6). The shaft 166 also carries a spur gear 167 that meshes with a similar gear 168 that is keyed on a stub shaft 169. The shaft 169 carries a gear 170 at its forward end, the gear 170 being in mesh with a gear 171. The gear 171 is secured on the rear end of a sleeve 172 on the forward end of which there is secured a gear 173 that drives a gear 174 on the shaft of the pressure roller 501. (This structure will be more completely described with reference to Fig. 6 under the description of the capsule forming unit 500.)

At the uppermost end of the vertical shaft 163 there is located a bevel pinion 175 which is meshed with a bevel gear 176 (see also Fig. 13). The gear 176 is formed on the lower end of a sleeve 177 that is inwardly splined and into which is telescopingly received the lower end of a splined shaft 178. The splined shaft 178 extends upwardly at an angle of approximately 45° and carries at its upper end an appropriately beveled pinion 179 which is meshed with a pinion 180 secured to the lowermost end of a vertical pump drive shaft 181.

The upper end of the pump drive shaft 181 carries a removable pinion 182 which is in mesh with an idler pinion 183 in turn meshed with a pump shaft pinion 184 that is secured on the lower end of a pump cam shaft 185. The upper end of the pump cam shaft 185 carries a spur gear 186 and an eccentric cam 187 (see also Figs. 14 and 15).

The gear 186 is in mesh with a gear 188 keyed to a vertical jackshaft 189 that carries a bevel pinion 190 at its upper end. The pinion 190 is in turn meshed with a bevel gear 191 which is secured at the rear end of a valve cam shaft 192 that also mounts a valve cam 193 in which is engaged a finger 194 of a slidable valve block 195. (A more complete explanation of the operation of the pump drive gearing will be found in the section of the specification entitled "Pump mounting and driving unit" and a more complete description of the pump operation gearing will be found in the section of the specification entitled "Pump.")

The purpose of the intermediate idler pinion 183 will be explained at length in the section of this specification entitled "Pump driving means," but briefly, it is mounted between the removable pinion 182 and the pinion 184 of the pump cam shaft 185 for two purposes. The first purpose is to accommodate change gears of different sizes (in place of the gear 182) thus to change the number of charges of substance delivered to the feeding nozzles 801 per rotation of the die roll 502 and, secondly, to permit phase changes between these two elements to control the timing of the discharge of substance with respect to the position of a nozzle 801 and a pocket in the pocketed sheet of gelatin 303 on the die roll.

GELATIN CASTING UNIT

Figure 3:
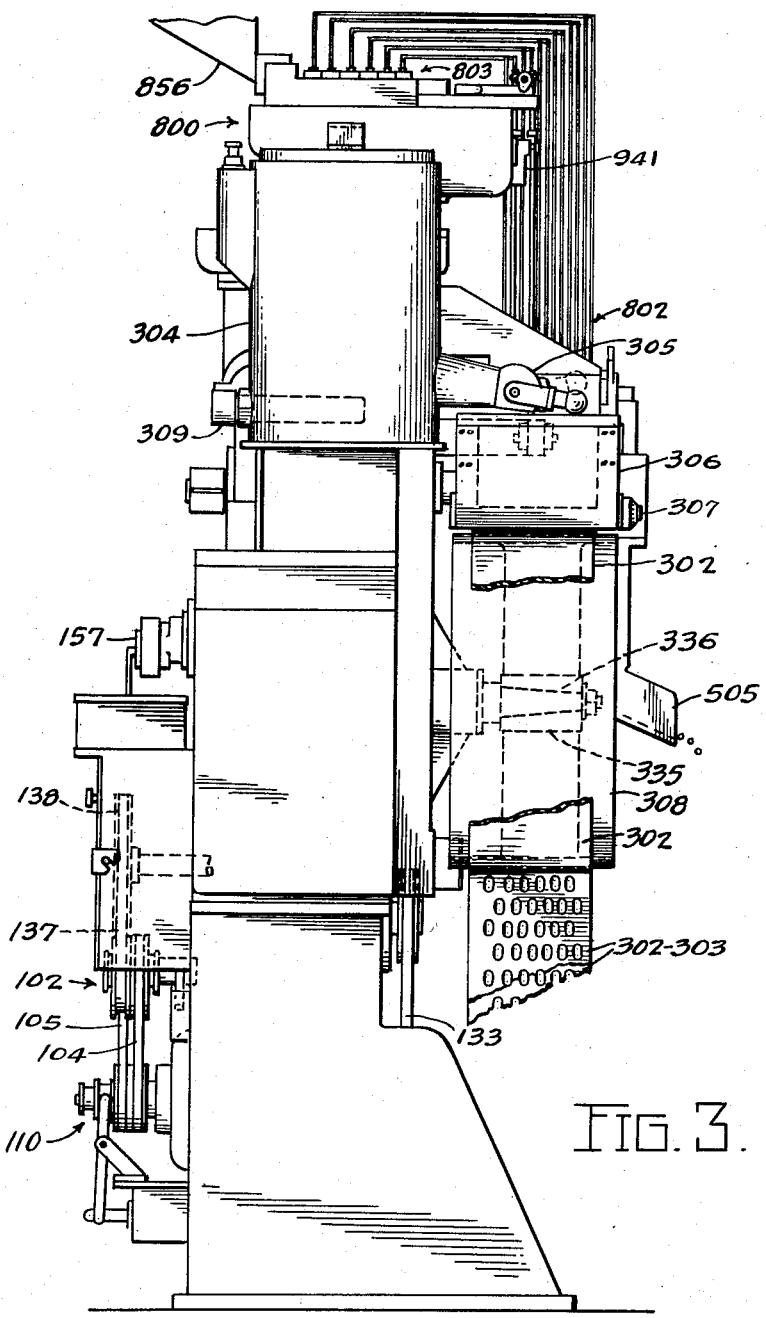
Fig. 3 is an end view in elevation taken from the position indicated by the line 3—3 of Fig. 1.

As is shown in Fig. 3, the main gelatin supply tank 304 at each side of the machine is heated by an electric heating unit 309 and keeps the main supply of gelatin in generally molten condition so that it will flow under control of the manually operated valve 305 into the spreader box 306.

The spreader box 306 (see Fig. 11) is partitioned by inner webs 310 and 311 to form an oil jacket 312 surrounding a central, generally hopper shaped, gelatin tank 313 into which gelatin flows from the valve 305. An electric heater 314 extends into the oil jacket 312 to keep the oil in the jacket at the correct temperature under the control of a thermostat, the settings of which are controllable by an adjusting knob 315 mounted on the front of the spreader box 306.

At the bottom of the hopper shaped gelatin tank 313 the doctor blade 307 in cooperation with a triangular projection 316 forms a narrow spreader opening 317 extending axially across the periphery of the casting drum 308.

The spreader box 306 is supported relative to the periphery of the casting drum 308 by a pair of main rollers 318 which ride the edge of the surface of the casting drum, by a pair of pins 319 (at the upper right of the box 306) that are engaged in slots 320 cut in ears 321 that are secured to a portion of the frame, and by an adjustable wheel 322. The wheel 322 is mounted at the bottom of a strut 323 which is secured to a vertically slidable block 324 by a pin 325. The block 324 is movable along a guide way 326 on the side of a bracket 327 that is secured to the side of the spreader box 306. A screw 328 is threaded into the block 324 and is rotatably mounted in an arm 329 of the bracket 327, which arm holds the screw 328 fixed, axially, with respect to the spreader box 306. A hand knob 330 having a series of indicia 331 which cooperate with an index 332 scribed in the side of the arm 329 is secured to the upper end of the screw 328.

By rotation of the hand knob 330 and the screw 328, the block 324 and wheel 322 are raised or lowered, tilting the spreader box 306 around the axis formed by the wheels 318 and raising or lowering the doctor blade 307 and triangular projection 316 relative to the surface of the casting drum 308. The slots 320 in which the pins 319 are engaged have circular edges that are cut with the axis of the wheels 318 as a center.

The casting drum 308 has a cylindrical rim 333 on the exterior of which the gelatin film is spread and dried, a radially extending web 334 and a hub 335 (see Figs. 1 and 3) that is provided with a tapered socket for the reception of the tapered end 336 of the shaft 122 (see Fig. 4).

The casting apparatus 301 for forming the gelatin film 303 which is located at the right side of the machine (Fig. 1), is identical with the apparatus already described except, of course, that it is reversed and, consequently, the right-hand casting drum 308 turns in a clockwise direction whereas the left-hand casting drum 308 turns in a counterclockwise direction.

Although the structure is omitted for sake of clarity to permit the gelatin film forming units to be seen in the several drawings, under some operating conditions and particularly where the machine is operated in a room in which the atmosphere is not controlled both as to temperature and humidity, sheet metal hoods may be erected around the casting drums and air of controlled humidity and temperature delivered to them in order to control the setting of the gelatin films so that by the time the casting drums 308 progress the film to a point where the films are stretched off the casting drums 308 by the treating units 400 and 401, the films will have reached perfect conditions for such operation.

FILM TREATING

After the gelatin film 302 travels around the periphery of the casting drum 308 it has assumed sufficient integrity of form by evaporation of solvents employed and by cooling to enable it to be removed from the surface of the drum. Because of its tacky nature, in common with similar films of materials such as natural rubber, synthetic resins, etc., it must be removed from the surface of the casting drum at a linear speed slightly in excess of the linear speed of the drum itself, thus stretching it off the drum.

This is accomplished by the film treating unit 400 and, more particularly, by the first of the three rolls 402, 403 and 404 comprising this unit. The gearing already described for driving the three rolls, viz., the bevel gear 118, shaft 119, worm 123 and worm gear 124, have a mechanical relationship such that the linear speed of the three rolls is greater than the linear speed of the casting drum 308 by an amount sufficient to pull the gelatin film 302 off the casting drum.

Figure 12:
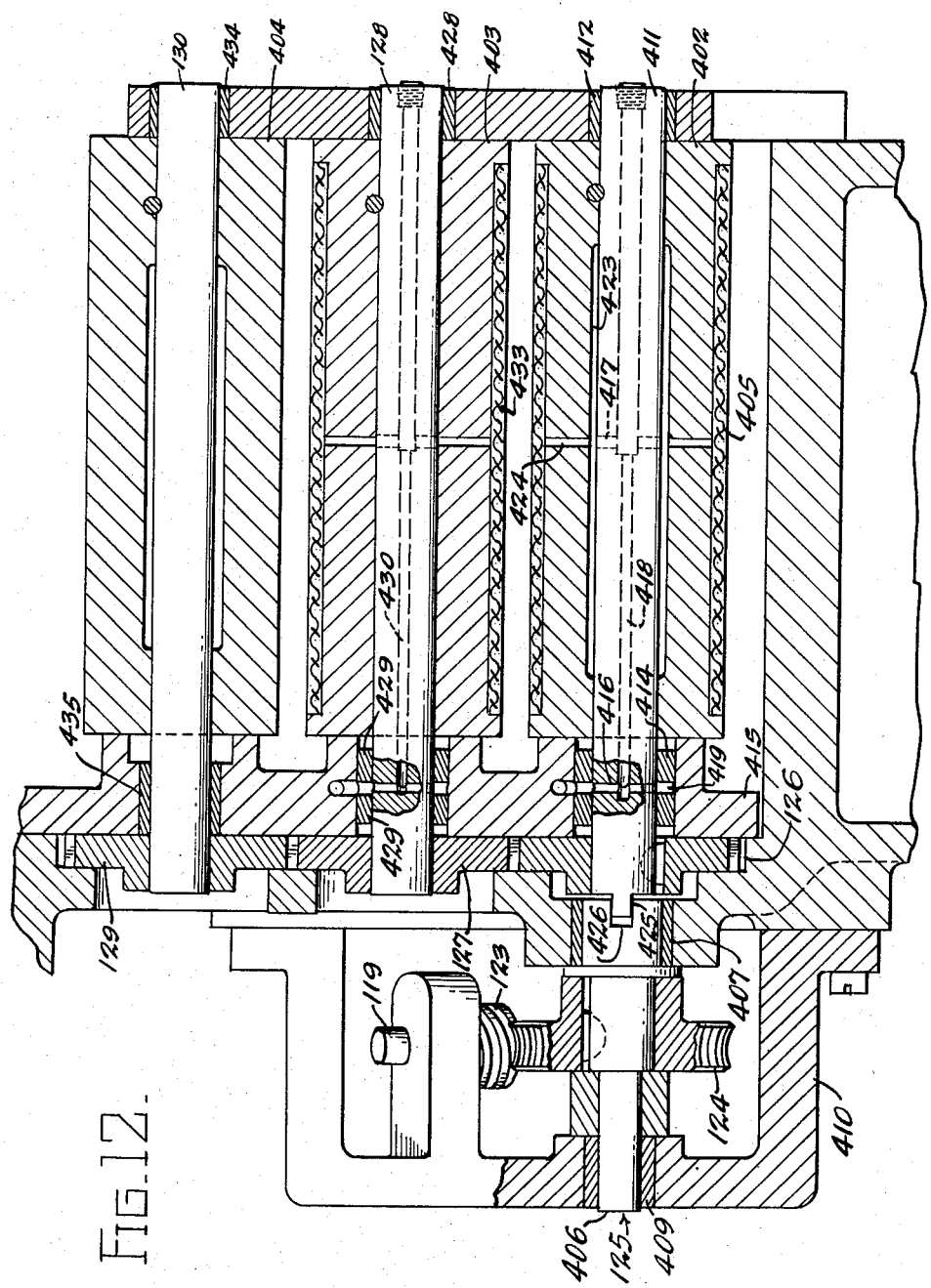
Fig. 12 is a fragmentary sectional view taken substantially on the line 12—12 of Fig. 11.
Figure 22:
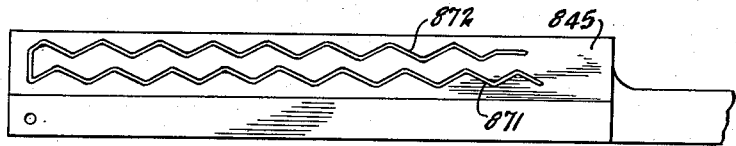
Fig. 22 is a view in elevation of that side of the valve shown in Fig. 19 opposite to that shown in Fig. 20.
Figures 19, 21:
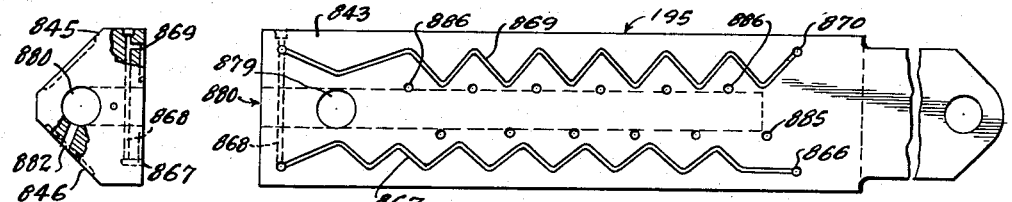
Figure 20:
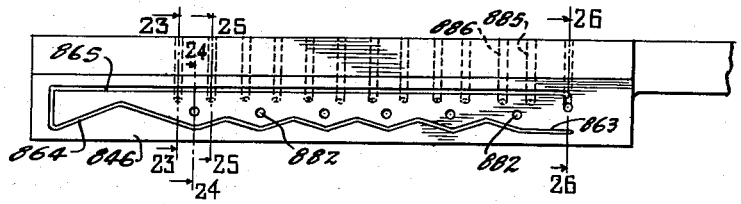
Fig. 20 is a side view in elevation of the valve shown in Fig. 19.
Figure 27:
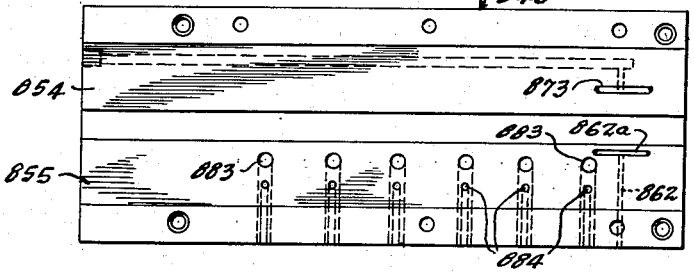
Fig. 27 is a plan view in detail of a V-block which cooperates with the valve block shown in Fig. 19.
Figure 28:
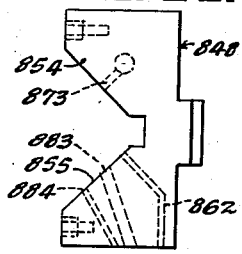
Fig. 28 is an end elevation taken from the right side of Fig. 27.

The gelatin film 302 is first led over the periphery of the first roll 402 which, as can best be seen in Fig. 12, has a felt surface 405 set in its recessed periphery.

The shaft 125 of the roll 402 is divided into two portions, a rear stub shaft 406 which is journalled in a sleeve bearing 407 mounted in a web 408 of the main frame and in a sleeve bearing 409 which is supported in a cup shaped cap 410 secured to the rear of the web 408; and a roll axle 411 which extends forwardly parallel to the shafts 128 and 130 of the two rolls 403 and 404. The axle 411 is journalled at its front end in a sleeve bearing 412 carried by an outboard frame element 413 and at its rear end in an oil block 414 carried in a rear frame element 415. The axle 411 is drilled to form radially extending oil passageways 416 and 417 and an axial oil passageway 418. The passageway 416 leads to an oiling groove 419 formed in the oil block 414 and communicating with the lower end of an oil line 420 (see Fig. 11) which connects the block 414 with a supply tank 421 located above the film treating unit 400. A valve 422 in the line 420 controls the rate of feed of oil from the tank 421 to the oil line 420 and through the oil passageways 416, 418 and 417. The inner surface of the roll 402 is relieved to form an annular chamber 423 which is in communication with radial lines 424 drilled in the roll and leading to its periphery for carrying the oil to the felt 405.

The rear end of the roll axle 411 has a tongue 425 which is engaged in a slot 426 cut in the forward end of the stub shaft portion 406 of the shaft 125.

The entire film treating unit 400 comprising the three rolls 402, 403 and 404 is supported by means of the outboard frame element 413 and the rear frame element 415 as a removable unit. The outboard frame element 413 has a downwardly depending arm-like portion 427 (see Figs. 1 and 11) which is removably secured to a part of the main frame of the machine, the tongue 425 and slot 426 providing for disassembly of the main input driving shaft 125 and removal of the film treating unit as a whole.

The spur pinion 126 is keyed on the axle 411 near its rearmost end and is in mesh, as earlier explained, with the spur pinion 127 which is secured on the rear end of the shaft 128 for the roll 403. The shaft 128 is journalled in a sleeve bearing 428 that also is mounted in the outboard frame element 413 and in an oil block 429 similar to the block 414. An oil passage system 430 through the block 429, shaft 128 and roll 403 carries oil delivered through a second oil line 431 (Fig. 11) under control of a valve 432 from the tank 421 to a felt 433 set into the periphery of the second roller 402 in a manner similar to that in which the oil is carried to the felt 405 of the roll 402.

The gelatin sheet 302 is carried up and over the roll 402 so that oil from its felt 405 coats one side of the sheet and then down beneath and around the roll 403 so that oil from its felt 433 coats the other side of the sheet 302.

The shaft 130 is similarly journalled at its front end in a sleeve bearing 434 in the frame element 413 but its rear end is journalled in a second sleeve bearing 435 in the rear frame element 415. The shaft 130 is parallel to the shafts 128 and 125 of the first two rollers. The pinion 129 is secured at the rear of the shaft 130 and, as above described, is in mesh with the pinion 127 of the roll 403.

Because of the opposite rotation of the rolls 402 and 403 and the interweaving passage of the gelatin sheet 302 thereover, both sides of the sheet are appropriately coated with the oil from the tank 421. This oil should be an edible oil, either mineral or vegetable, which serves the purpose of rendering the surface of the gelatin less tacky and lubricating the film as it passes over the third roller 404 which guides it en route to the capsule forming mechanism 500. The presence of the thin film of oil on the gelatin sheet 302 prevents it adhering to any of the subsequent rollers over which it passes.

The operation of the right-hand sheet treating unit 401 is substantially identical with that of the unit 400 described in detail, the only difference being the difference in linear speeds of the three treating rollers comprising the unit 401 and resulting from the differential setting between the speed change units 102 and 103.

The third roller 404 does not coat the gelatin sheet with oil since both sides are coated before the sheet engages that roller but serves principally to redirect the gelatin film 302 toward the capsule forming unit 500.

CAPSULE FORMING UNIT

The capsule forming unit generally indicated at 500 actually constitutes the operative part of the machine. As can best be seen by reference to Figs. 1 and 5, the two gelatin films 302 and 303 are led upwardly from the film treating units 400 and 401 into converging paths between the sealing roller 501 and die roll 502.

The sheet 302, after leaving the third roll 404 of the film treating unit 400, is carried up and over a smooth periphery idler roller 509 (Fig. 5) and thence up and over the surface of the sealing or pressure roller 501. The sealing roller 501 is journalled in a pair of rockable arms 510 which are mounted on a pin 511 extending between two ears 512 erected upwardly from a roll frame 513. Expansion springs 514 extend between the frame 513 and the rockable arms 510 tending to swing the arms in a clockwise direction (Fig. 5) on the pin 511 and thus to force the periphery of the sealing roller 501 toward the periphery of the die roll 502. The idler roller is journalled at the rear ends of the frame 513 on a pin 515 parallel to the pin 511 and axis of the sealing roller 501.

Figure 5:
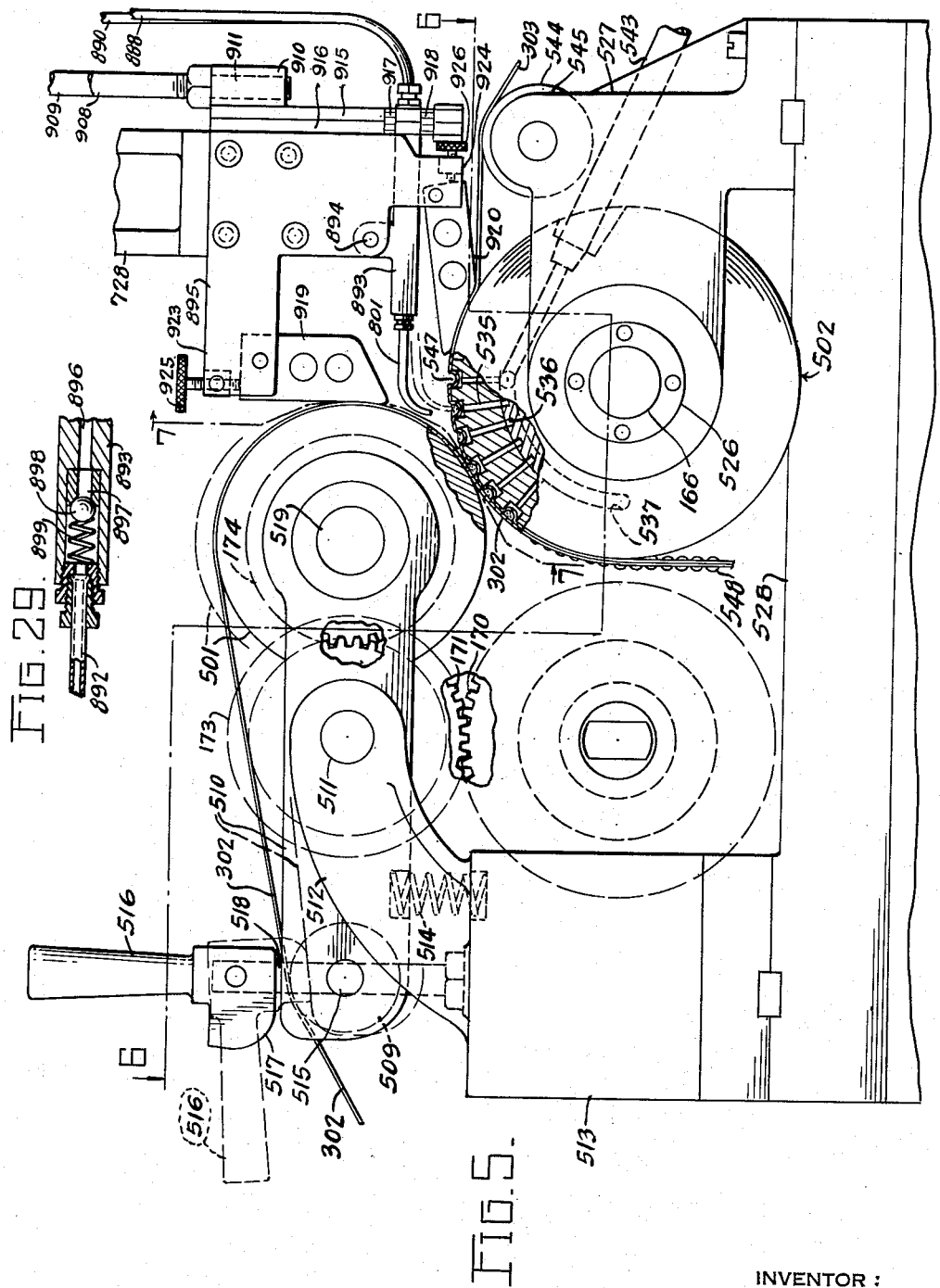
Fig. 5 is a fragmentary view in front elevation of the capsule forming portion of the machine.

A locking handle 516 (Fig. 5) having eccentric shoulders 517 is pivotally mounted on the upper end of a pin 518 erected from the frame 513 and, when swung downwardly as is shown in the broken lines in Fig. 5, pushes down on the left end of the rocking arm 510 compressing the springs 514 and lifting the sealing roller 501 away from the die roll 502. The sealing roller 501 rotates on a shaft 519 which is journalled in the ends of the arms 510. The shaft 519 carries the pressure roller gear 174 that is driven by the gear 173 (see also Figs. 4 and 6) that is integral on the forward end of the sleeve 172, already described. The sleeve 172 is journalled on a rear extension 520 of the pin 511. Thus when the sealing roller is lifted as by swinging the locking handle 516 downwardly into the position shown in dotted lines in Fig. 5, its driving gear 174 remains in mesh with the gear 173 because the axes for the gear 173 and the pin 511 are the same so the gear 174 is merely revolved around the gear 173.

The stub shaft 169, earlier described, is journalled in a pair of bearings 521 that are mounted in webs 522 and 523, with its axis parallel to the axes of the sleeve 172, pin 511, sealing roller 501, die roll shaft 166 and die roll 502. The shaft 169, as earlier explained, carries the transfer gear 168 by which power from the gear 167 on the die roll shaft 166 is led to the pressure or sealing roller 501.

The die roll shaft 166, which carries the die roll drive worm gear 165 and transfer gear 167, is journalled at its rear end in a bearing 524, near its center in a heavy bearing 525, and at its front end by an outboard bearing 526 which is mounted in the end of an outboard support arm 527. The support arm 527 is fixed in ways and securely bolted to a heavy frame bracket 528 forming a substantial portion of the main frame. The outboard support arm 527 is so mounted in order to permit its removal for the purpose of changing die rolls for fabrication of capsules of different volumes in a manner to be explained.

The die roll itself consists of a tubular center member 529 which has a sliding engagement with the forward portion of the die roll shaft 166 and which is held in place thereon by a removable retaining nut 530 that is engaged with a short threaded portion on the shaft 166. A tubular die section 531 is slipped over the exterior of the center member 529 and is retained in place thereon by a spanner nut 532 which is threaded onto a tubular portion 533 of the center member 529. The die section 531 of the die roll 502 has a plurality of circumferentially spaced, axial rows of die pockets 534 cut in its outer surface. Fig. 30 shows a fragment of this construction, illustrating two of the rows of die pockets 534, the rows being indicated as "Row A" and "Row B." Each of the die pockets 534 is connected by a radially extending orifice 535 to an exhaust passageway 536 extending axially between the exterior of the center member 529 and the interior of the die section 531 and actually consisting of a slot milled in the surface of the center member 529. Each of the exhaust passageways 536 is connected to a single axial row of die pockets 534 and thus as the die roll 502 rotates each successive axial row of die pockets 534 is connected, through its exhaust passageway 536, to an arcuate groove 537 in a disklike vacuum manifold 538. The vacuum manifold 538 is resiliently pressed against the rear of the die roll 502 by a plurality of springs 539 acting between its rear face and a ring 540 that circumscribes the shaft 166 and rests against a forward collar 541 on a box 542 in which the central shaft bearing 525 is mounted.

The arcuate groove 537 is in communication with a source of vacuum through a line 543. The arcuate extent of the groove 537 is such that vacuum is applied to each of the axial rows of die pockets 534 at a time appropriate to depress the sheet of gelatin 303 thereinto for the reception of a charge of content substance from the nozzles 801.

The slot 537 extends to a point sufficiently far removed (with respect to the rotation of the die roll 502) that vacuum remains in each of the passageways 536 and in each axial row of die pockets 534 until the sealed capsules are given an opportunity to dry sufficiently so that they can be removed from the web 302—303 formed by the two sheets of capsulating gelatin. At this point, apparent more particularly in Fig. 5, each of the axial passageways reaches the end of the arcuate vacuum slot 537, and vacuum is removed from behind the die pockets 534 of the corresponding axial rows of die pockets permitting the capsules to form.

The second sheet of gelatin 303 is led upwardly from its treating unit 401 over an idler roll 544 (Fig. 5) which is journalled at the front in an ear 545 on the upper end of the support arm 527 and at the rear in a portion of the main frame, and thence over the upper periphery of the die roll 502 which is rotated in a clockwise direction (Fig. 5). Almost simultaneously with the engagement of the gelatin sheet 303 with the periphery of the die roll 502, that axial row of pockets 534 which is presently in line with the upper end of the arcuate vacuum slot 537 is subjected to vacuum and pulls portions of the gelatin defined by lips 546 of the die pockets 534 downwardly into such row of die pockets. The depth of the die pockets is such that when gelatin of a controlled thickness is drawn therein under a controlled vacuum, a pocket of specific volume is formed.

When capsules having different volumes are to be fabricated, the volumetric change may be accomplished either by increasing or decreasing the diameter and/or depth of the die pockets 534 (if the die pockets are circular) or by changing corresponding dimensions of elliptical pockets, or by increasing or decreasing the thickness of the gelatin film 302. Thus volumetric control of fabricated capsules through these combinations of means can be varied almost infinitely.

After the gelatin is depressed into the die pockets 534 forming semi-ellipsoidal or, in this case, hemispherical, pockets 547, the formed pockets 547, still empty except for air, pass beneath the ends of the nozzles 801 and into each pocket 547 there is deposited a charge of substance to be capsulated of such volume as to fill the pocket 547 to its brim. Each filled row of pockets 547 then rotates further in a counterclockwise direction (Fig. 5) until it passes beneath the cover sheet of gelatin 302 being brought around and into convergence with the now pocketed sheet 303 by the sealing roller 501. The force of springs 514 acting through the arms 510 squeezes the periphery of the sealing roller 501 downwardly against the two sheets of gelatin 302 and 303 adhering them to each other around the margins of each of the die pockets 534 forming closed capsules 548 and, pinching off the two sheets of gelatin against the lips 546 which surround each of the pockets 534. As the die roll continues to turn, carrying the filled, sealed, semi-ellipsoidal capsules 548 away from the sealing station, the gelatin sets up and when each axial row of die pockets 534 reaches the end of the arcuate vacuum groove 537 each row of capsules 548 "pops out" of its die pockets 534 as the differential in stresses between the pocketed sheet of gelatin 303 and generally flat covering sheet of gelatin 302 is equalized.

Figure 8:
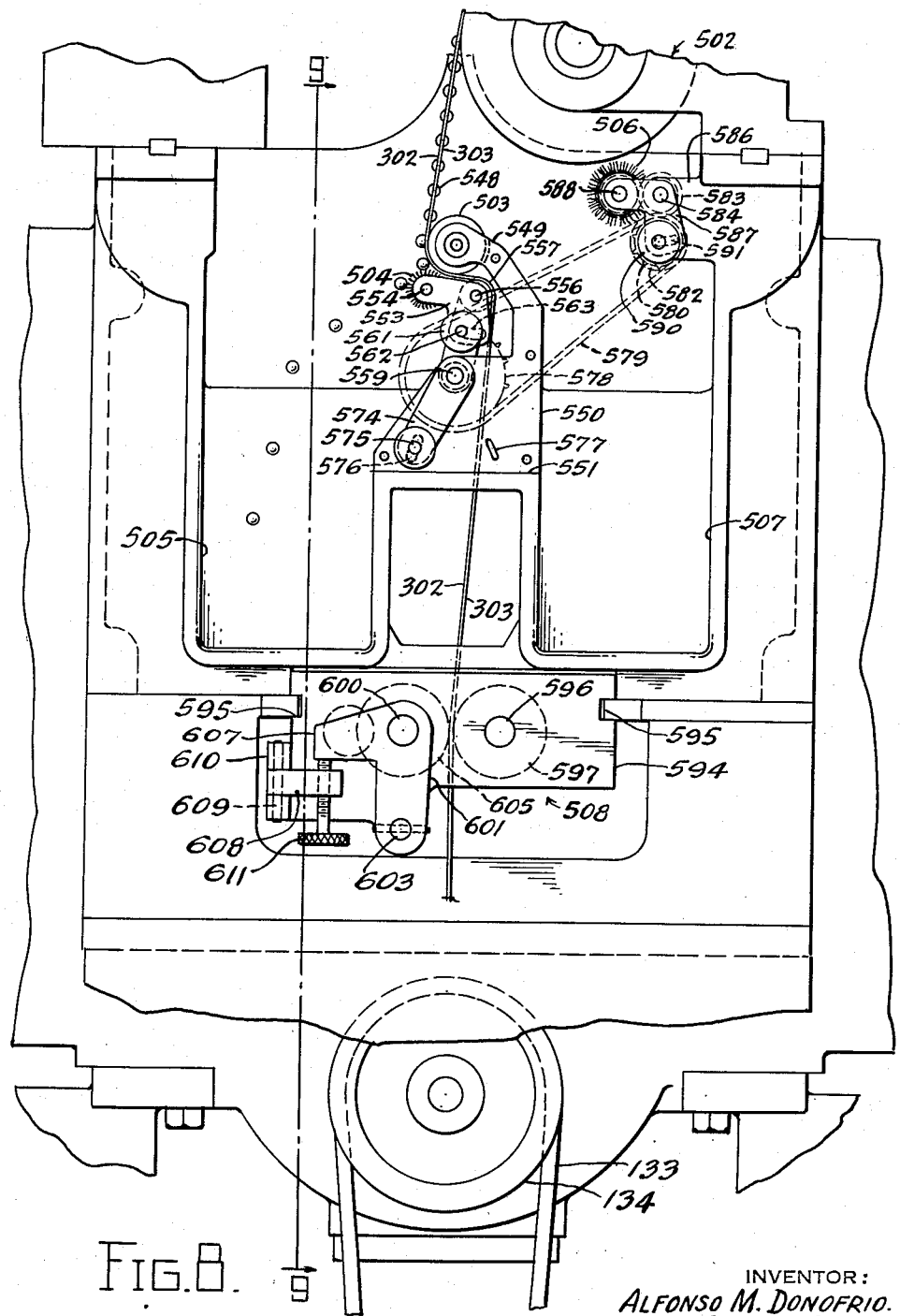
Fig. 8 is a greatly enlarged fragmentary view in front elevation of the centermost portion of the machine illustrated in Fig. 1 and particularly of the capsule ejection and web disposal portions of the apparatus.

The web 302—303 containing the almost severed formed capsules 548 then passes downwardly and around the breakout roller 503 (see Figs. 8, 9 and 37). The breakout roller 503 is journalled in a pair of arms 549 which are erected on a frame 550 carried by a cross frame 551 extending between the two chutes 505 and 507.

The breakout roller 503 is not driven but is frictionally rotated by the passage of the web 302—303 thereover. The counter-rotating brush 504 is journalled in the ends of a pair of bell cranks 553 and 554 by a shaft 555 which is mounted in the bell crank arms. The cranks 553 and 554 are pivotally mounted on the ends of a shaft 556 of a smooth surface feeding roller 557. The shaft 556 is in turn journalled in the ends of a pair of arms 558 which are pinned to a shaft 559 (Fig. 9). The shaft 559 is journalled at the rear in a boss 560 on the casting from which the chutes 505 and 507 are formed and, at the front end, in the frame plate 550.

A thumb nut 561 is threaded into the arm 558 and has a pin 562 which extends through a slot 563 cut in the arm of the bell crank 553. By loosening the thumb nut 561 the bell cranks 553 and 554 can be swung on the shaft 555 with respect to the arms 558 and the brush 504 can be adjustably positioned with respect to the breakout roller 503 to exert more or less brushing action on the surface of the web 302—303 passing around the roller 503.

A pinion 564 is fixed on the rear end of the brush on the shaft 555 and is meshed with a pinion 565 that is secured on the rear end of the shaft 556 of the smooth surface feeding roll 557. The pinion 565 in turn is meshed with a gear 566 that is secured on the inner end of a shaft 567 journalled in a boss 568 (Fig. 9) coaxially with the shaft 559 and that has a squared rear end 569 that is adapted to removably enter a socket 570 formed in a driving plate 571 that is located on the front end of the shaft 160. A driving pin 572 is studded into the rear face of the gear 566 and engageable in a corresponding hole 573 in the face of the plate 571.

A lever 574 is pinned on the front end of the shaft 559. At the lower end of the lever 574 there is located a spring pressed, thumb released pin 575 which is adapted to socket in either of a pair of holes 576 or 577 formed in the face of the frame plate 550.

By disengaging the pin 575 from the hole 576 (in which it is shown engaged in Figs. 8 and 9) and swinging the lever 574 in a counterclockwise direction (Fig. 8) the two arms 558 which also are pinned to the shaft 559 also are swung, carrying the bell crank levers 554 and 553 in which brush 504 and smooth surface feeding roller 557 are mounted, downwardly to the left (Fig. 8) out of engagement with the web 302—303. This movement of these elements is possible because the pinion 565 (which drives the roller 557) and the pinion 564 (which drives the brush 504) are mounted on the shaft 556 carried by the arms 558 that pivot on the axis of the main gear 566. Thus when the lever 574 is swung swinging the brush 504 and roller 557, the gear 565 revolves around the gear 566 in a "planetary" manner. This adjustment is provided for in order to enable the operator to feed the web 302—303 downwardly between the breakout roller 503 on the one side and brush 504 and feeding roller 556 on the other side.

A chain sprocket 578 is pinned on the shaft 567 and is engaged with a chain 579 which in turn drives a sprocket 580. The sprocket 580 is pinned on a stub shaft 581 which also carries a pinion 582. The pinion 582 is in mesh with an intermediate pinion 583 mounted on the rear end of a shaft 584. The shaft 584 is journalled in a boss 585 at the rear end in an arm 586 which extends inwardly from the frame of the machine above the chute 507 and just below the surface of the die roll 502 (Fig. 8). A bell crank 587 is rockingly mounted on the shaft 584. One of the arms of the bell crank 587 rotatably mounts a shaft 588 for the die roll brush 506 and the other of its arms carries a thumb nut 590 which extends through a slot 591 in the arm of the bell crank 587 and is threaded into the arm 586. The die roll brush 506 is rotated with the shaft 588 by a pinion 592 (Fig. 37) that is secured on the rear of the shaft 588 and in mesh with the intermediate pinion 583.

By loosening the thumb nut 590 the bell crank 586 can be swung to adjust the die roll brush 506 relative to the surface of the die roll 502 in a manner similar to that in which the counter-rotating brush 504 can be adjusted with respect to the breakout roller 503. A spring-backed take-up sprocket 593 (Fig. 37) is engaged with the chain 579 to accommodate the slack caused by adjusting the position of the brush 506 and the driven sprocket 580.

It should be observed that the direction of rotation of the brushes 504 and 506 is contra to the direction of the rotation of the breakout roller 503 and die roll 502, respectively, in order to more effectively remove capsules 548 therefrom.

After the web 302—303 passes around the breakout roller 503 and feeding roller 557 it is led downwardly between the pair of parallel, closely adjacent pulling rollers generally indicated by the reference numeral 508 (Figs. 8, 9, 10 and 32). The pulling rolls 508 are both carried in a rectangular open frame 594 which is mounted to slide horizontally in a pair of ways 595 at the bottom of the chutes 505 and 507. The pulling rolls 508 are driven from the drive gear 151 which meshes with the pulling roll input gear 152 that is keyed to a shaft 596 journalled in the frame 594 and carrying a fixed pulling roller 597. A gear 598 also is keyed to the shaft 596 and is meshed with a similar gear 599 that is secured on the rear end of a shaft 600 mounted in the upper ends of a pair of rocking arms 601 and 602 that are in turn pinned on a shaft 603 that is rockingly mounted in a pair of ears 604 extending downwardly from the front and rear cross elements of the open frame 594. The shaft 600 rotatably mounts a movable pulling roller 605. A pair of arcuate slots 606 are cut in the front and rear cross arms of the open frame 594.

The rocking arm 602 (located at the front of the machine) has a locking finger 607 extending horizontally away from the roller 605. A swinging arm 608 is pivotally mounted on a vertical pin 609 that is positioned in an ear 610 of the frame 594 and at its forward end carries a vertically extending thumb screw 611, the upper end of which bears on the under surface of the locking finger 607. By loosening the thumb screw 611, the arm 608 can be swung sideways allowing the arms 602 to drop to the left (Fig. 8) or right (Fig. 32) disengaging the pulling roller 605 from the surface of the web 302—303 and similarly disengaging its driving pinion 599 from the gear 598. This spaces the two pulling rollers 597 and 605 allowing the operator to initially feed the web 302—303 therebetween. Adjustment of the thumb nut 611 also allows the movable pulling roller 605 to be squeezed more or less tightly against the web 302—303 to more or less tightly grasp it between the two pulling rollers 597 and 605.

The pulling rollers 508 (as a unit) are driven at a linear speed in excess of the linear speed of the die roll 502 and sealing roller 501. Thus the web 302—303 is considerably stretched after leaving the die roll 502, substantially elongating (see Fig. 9) the holes punched in the web 302—303 when the capsules 548 are formed. This elongation frees the capsules 548 from the web 302—303 on almost their entire circumferences and makes it easier for the counter-rotating capsule brush 504 to flick the capsules 548 out of the web 302—303.

After leaving the pulling rollers 508 the web passes downwardly either into a refuse can for disposal or into a container for accumulation and subsequent remelting.

PUMP MOUNTING AND DRIVING UNIT

The pump mounting and driving unit 700 (see Figs. 13 and 14 particularly) is driven by the bevel pinion 175 that is pinned at the upper end of the vertical pump driving shaft 163. The pinion 175 is in mesh with a similar bevel pinion 176 which is formed as a part of, or otherwise secured to the lower end of an inwardly splined sleeve 177. The sleeve 177 is journalled in a bearing 701 which is mounted in a gear housing 702 that is secured on an upper cover plate 703 of the main column 100. The lower end of the splined shaft 178, already mentioned, telescopes within the inwardly splined sleeve 177 thus allowing the shaft 178 to be moved on an axial line upwardly and to the right in Fig. 13.

This provision for telescoping movement between the shaft 178 and its driving sleeve 177 is designed to allow the entire pump and all of its associated mechanisms to be moved on a line parallel to a line tangential to the intersection between the sealing or pressure roller 501 and the die roll 502 (see Fig. 13). The pump and its associated mechanism are mounted for such movement on a bracket 704 which is integral with the plate 703 and which has an upwardly turned arm 705 in which are secured the ends of parallel guide rods 706 (see also Fig. 7) that form the slide for the pump and its mechanism.

The lower ends of the rods 706 are pinned in a lower arm 707 of the bracket 704 which is spaced from and parallel to the arm 705 thereof. A main pump housing 708 has two downwardly extending, spaced arms 709 carrying sleeves 710 that are slidingly engaged with the guide rods 706. The housing 708 has a third downwardly extending arm 711 spaced from and parallel to the arms 709 and located at its upper end. A screw 712 is threaded through the upper arm 705 of the bracket 704 and rotatably mounted in the arm 711 of the pump housing 708 by a collar 713 and hand crank 714 which are pinned to the shaft of the screw 712 on opposite sides of the arm 711.

When the hand crank 714 and screw 712 are rotated, the main pump bracket 708 and all of the mechanisms supported thereby are slid upwardly or downwardly on the guide rods 706 with the splined shaft 178 telescoped more or less in the inwardly splined sleeve 177 but without disengaging the driving connection. This moves the entire pump mechanism along the line tangentially to the intersection between the tension roller 501 and die roll 502 thus adjusting the position of the nozzles 801 relative thereto.

The pump housing 708 and its associated mechanism including the pump drive and supporting unit 700 and the pump 800 itself are thus unitary in drive and mounting and by rotating the hand wheel 714 the entire mechanism can be moved out of the way when the machine is first placed into operation to permit the facile insertion of the two sheets 302 and 303 between the sealing roller 501 and die roll 502.

The splined shaft 178 is journalled in a bearing 715 carried by a bearing plate 716 secured to a web 717 formed in the interior of the main pump housing 708. At the uppermost end of the shaft 178 the bevel pinion 179 is secured and is in mesh with the similar bevel pinion 180 that is pinned on the lower end of the short shaft 181 (see also Fig. 14). The shaft 181 extends upwardly through a plate 718 which forms the bottom of an oil pan 719 and removably mounts on its upper end the large spur gear 182. As can best be seen in Figs. 14 and 17 the oil pan 719 is open upwardly permitting easy access to the gear 182 which is secured on the upper end of the shaft 181 by a nut 720 and to its associated idler pinion 183 that is rotatably mounted upon a pin 721 secured in the rear corner of a generally triangular plate 722. The plate 722 (more clearly seen in plan in the broken line outline in Fig. 17) is swivelably engaged around the lower end of the pump drive shaft 185 so that it can be rotated therearound in a horizontal plane. The idler gear 183 is meshed with the gear 184 which, as explained above, is keyed to the shaft 185. The centers of rotation of the plate 722 and the gear 183 both being the axis of the shaft 185, when the plate 722 is swiveled, the gear 183 remains in mesh with the gear 184. Similarly, when the plate 722 is swiveled the gear 183 carried thereby is moved on a line generally radial with respect to the shaft 181 and gear 182 and thus can be moved into appropriate engagement with smaller or larger gears 182. The movement of the plate 722 and its retention in adjusted position is controlled by a clamping pin 723 which extends upwardly through a boss 724 in the plate 718 and through an arcuate slot 725 in the plate 722. When a nut 726 on the lower end of the pin 723 is loosened the plate 722 may be moved and by tightening the nut 726 retained in its adjusted position. The nut 726 is accessible through an opening 727 in the forward wall of the main pump housing 708.

The banks of nozzles 801 are supported by a downwardly and forwardly extending nozzle bracket 728 (see Figs. 5, 7 and 13) that is bolted on a pad 729 on the front of the main pump housing 708.

As has already been briefly explained, the operation of the pump 800 is such that one charge of substance to be encapsulated is deposited through a nozzle 801 into a capsule pocket 547 as each die pocket 534 is moved into position beneath its corresponding nozzle 801. As also has been briefly explained, the size of the die pockets 534 and the number in each circumferential row around the periphery of the die roll 502 is determined by the volumetric content of the finished capsules, i. e., the larger the capsules the lesser the number of die pockets in each circumferential and, of course, radial row of die pockets 534.

It is necessary, therefore, to time the operation of the pump 800 so as to discharge one charge of substance for each pocket. Inasmuch as the pump 800 and the die roll 502 are both driven off the main drive of the machine, the adjustment between their timing is accomplished by changing the pick off gear 182 in the manner just described. If a greater number of discharges per rotation of the die roll 502 is required, a gear 182 of larger diameter and a larger number of teeth is placed on the upper end of the shaft 181 and, in the manner described, the intermediate idler gear 183 is adjustably positioned to transmit power to the gear 184 on the lower end of the pump drive shaft 185. Conversely, if the capsule volume is larger and a lesser number of discharges of the pump is required, a smaller gear 182 may be placed on the shaft 181 and the plate 722 moved in a clockwise direction (Fig. 17) to re-engage the gear 183 with the gear 182.

As will later appear when a complete description of the pump 800 and its nozzles 801 is read in the following section, it also is necessary to adjust the phase relationship between the rotation of the die roll 502 and the action of the pump 800 and nozzles 801. This adjustment in phase relationship, as well as the adjustment in timing relationship already described, is accomplished through the medium of the intermediate "planetary" idler gear 183. To change the phase relationship between the die roll 502 and the pump 800 involves a change between the driving relation of the gears 182 and 184. After the proper gear 182 for the number of die pockets 534 in a given die roll 502 is in place, the phase relationship between the operation of the pump 800 and the rotation of the die roll 502 is appropriately adjusted by rotating the pump driving gear 184 and its meshed "planetary" intermediate idler gear 183 in the appropriate direction before re-engaging the gear 183 with the change gear 182. Because of the relatively large size of the several gears 182, 183 and 184 which are involved and because of the numbers of variations in the numbers of teeth in the remaining gears involved in the gear trains, adjustments of phase between the pump 800 and die roll 502 is almost infinite, it being possible, of course, to reposition the gear 183 in mesh with the gear 182 with as little as one tooth variation.

PUMP

Pump piston drive

The pump generally indicated at 800 and shown in detail in Figs. 14 through 28, has two principal driven mechanisms. The first of these is the pumping mechanism and the second is the valving mechanism.

The pumping mechanism is driven by the pump cam 187 which is eccentrically mounted at the upper end of the shaft 185 and which comprises a roller 804 that is positioned between two opposed adjustable abutments 805 and 806. The abutments 805 and 806 are engaged with an adjusting screw 807, having two threaded sections 808 and 809 of opposite hands, threaded, respectively, through the abutments 805 and 806. The screw 807 is rotatably mounted in a yoke 810 having horizontally extending ways 811 (Fig. 14) in which the abutments 805 and 806 slide when the screw 807 is rotated. The screw 807 extends out the left side of a pump housing wall 812 (Fig. 15) and has a knurled hand knob 813 fixed on its outer end. The left side of the stem of the screw 807 is centrally bored and threaded to receive a rod 814 on the outer end of which a thumb nut 815 is pinned. The inner end of the rod 814 has a cone pointed end extending between the ends of two opposed, radially extending locking pins 816 having rounded inner ends. The outer ends of the pins 816 bear against the interior of a bore 817 in a portion of the yoke 810 which also serves to rotatably mount the screw 807. A collar 818 is mounted at the outside of each of the end arms of the yoke 810 and pinned to the screw 807 to prevent its movement in the yoke 810.

When the hand knob 813 is rotated the two abutments 805 and 806 are either brought closer together or moved farther apart and are fixed in the adjusted position by turning the knob 815 inwardly so that its cone pointed end forces the pins 816 outwardly locking the screw 807 in the yoke 810.

The yoke 810 is in turn mounted for slidable movement by a pair of guides 819 (Fig. 14) which are secured to parallel shoulders 820 formed on a web of the pump housing. The sliding yoke 810 is operatively linked to a transversely extending piston yoke 821 (Fig. 15) by means of a tongue 822 on the yoke 821 that is engaged in a slot 823 in the upper surface of the abutment yoke 810. The piston yoke 821 has a plurality of upwardly extending fingers 824 that are engaged between pairs of spaced collars 825 formed at the outer ends of a plurality of pump pistons 826. Each of the pistons 826 is slidingly mounted in a pump cylinder sleeve 827 that is press fitted into a pump cylinder block 828 extending across the upper portion of the pump and mounted atop pedestals 829 (Fig. 14) of the pump housing.

An indicator actuating stem 830 (Fig. 15) which is studded into the piston yoke 821 extends to the left and beyond the housing wall 812 where it is in engagement with a plunger 831 of a dial indicator generally indicated at 832 that measures the stroke of the piston yoke 821 and thus indicates the volume discharged from each of the pump pistons 826.

Adjustment of the hand knob 813 and the resulting change in spacing between the opposed faces of the abutments 805 and 806 increases or decreases the amount of "lost motion" between the cam roller 804 of the pump driving cam 187 and the faces of the two abutments 805 and 806. Thus if the abutments are spaced closely together, i. e., substantially against the surface of the cam roller 804, the abutments and their yoke 810 and thus the pump piston yoke 821 and the pistons 826 are all driven through a stroke having a linear dimension equal to the total maximum diametric displacement of the cam roller 804. If, however, the abutments 805 and 806 are adjusted to leave a space between their parallel opposed faces greater than the diameter of the cam roller 804, the "lost motion" of the cam roller 804 after it leaves one of the abutments, say the abutment 806 against which it is shown positioned in Fig. 15, and until it engages the face of the opposed abutment 805, reduces the amount of movement of the abutments and consequently the length of stroke of the pistons 826. When the two abutments are spaced at their utmost spacing and the distance between their opposite inner faces is greater than the maximum diametric displacement of the outside of the cam roller 804, then the cam roller 804 can revolve without striking the abutments 805 and 806, and no movement of the pump pistons 826 is effected. Between these extremes, infinite variations of the volume of substance discharged by each stroke of the pump pistons can be made to provide for the fabrication of capsules of different selected volumes.

The timing of operation through the gear train earlier described is such that the pump pistons are reciprocated through an intake and exhaust stroke for each successive axial row of pockets 534 in the die roll 502.

It will be observed that there is a pump piston 826 for each die pocket 534 in a single axial row of die pockets. If capsules of larger sizes are to be fabricated, a die roll 502 having a lesser number of die pockets 534 in each axial row is used and the number of pump pistons 826 used correspondingly is reduced.

*Pump valve drive*

It will be noted, however, that in the pump mechanism disclosed there are twice as many nozzles 801 in the bank of substance depositing nozzles, already generally referred to, as there are pistons 826 in the bank of pistons. Of course, it would be equally feasible to employ the same number of nozzles as pistons, and mechanism having this relationship will be described below in the section of this specification pertaining to the "Powder filling attachment."

The driving relationship of the numerous parts is such that odd numbered ones of the nozzles 801 are employed to fill the depressions in the encapsulating film formed in alternate axial rows of the die pockets 534, and even numbered nozzles 801 in the bank are employed for filling the depressions formed in intervening axial rows of die pockets 534. The valving means for selecting that bank of odd numbered nozzles 801 or even numbered nozzles 801 from which a discharge of substance will be effected upon a discharge stroke of the bank of pump pistons 826, will now be described.

The second of the pump driving means mentioned above comprises the gear 188 which is driven from the gear 186 and which rotates the vertical jackshaft 189, the bevel pinion 190 and the meshed cam shaft pinion 191 which rotates the cam shaft 192. The valve cam 193 is rotatably mounted upon the shaft 192 and can be driven with the shaft 192 upon engagement of a clutch generally indicated at 833, the details of which will be described below.

The cam 192 has a peripheral cam track 834 that is provided with four circumferentially extending cam surfaces (see Fig. 18) 835, 836, 837 and 838 and with short inclined intervening surfaces 839 which connect the surfaces 835, 836, 837 and 838. Fig. 18 is a development of the cam surfaces illustrating the relationship between the exhaust and intake strokes. Between each exhaust stroke (the corresponding cam surfaces being 835 "exhaust right" and 837, "exhaust left") there occurs an intake stroke (the "intake" surface 836 or 838) the "exhaust right" surface 835 being located on the side of the cam track center line opposite to that on which the "exhaust left" surface 837 is located and the "intake" surfaces 836 and 838 being centrally located with respect to cam track center line.

The cam track 834 of the cam 193 is engaged by the finger 194 (Fig. 14) already mentioned and which comprises a cam track roller 840 rotatably mounted on the lower end of a pin 841 that is fixed in the outermost end of an arm 842 of the slidable valve block 195.

When the clutch 833 is engaged and the cam 193 rotated, the roller 840 follows the cam track 834, moving the sliding valve block 195 back and forth (actually from front to back) of the pump housing. (It should be noted that Fig. 14 illustrates the pump in section with the front of the machine at the right and Fig. 15 shows the pump in vertical section looking toward the back, while Fig. 17 shows the pump generally in plan view with the front of the machine at the right and thus corresponds to Fig. 14.)

Valve

The valve slide block 195 is shown in detail in Figs. 19 through 26 inclusive. The block 195 has a flat top 843, short vertical parallel longitudinal sides 844 and inwardly inclined valving surfaces 845 and 846 having a flattened downwardly turned apex 847 so that, in cross section, the block 195 is generally wedge shaped.

The block 195 slides in a cooperating V-shaped valve block 848 (Fig. 15 and, in detail, Figs. 27 and 28) that extends from front to back of the pump and is fixedly positioned on a rest plate 849 that has a machined way 850 for its precise positioning.

The sliding valve block 195 also cooperates with a fixed position cap plate 851 that is mounted above the V-block 848 and fixedly secured thereto by machine bolts 852.

Two systems of passageways are formed by the three cooperating elements of the valve, viz., the sliding block 195, the stationary V-block 848 and the cap plate 851. These two ssysstems of passageways are (a) a lubricating system which is designed to maintain a thin film of lubricating oil between the upper flat surface 843 of the sliding block 195 and a flat downwardly turned mating surface 853 of the cap plate 851 and between the valving surfaces 845 and 846 of the sliding valve block 195 and corresponding flat sides 854 and 855 respectively of the stationary V-block 848; and, (b) the passageways for valving substance to be encapsulated from a supply tank 856 (Fig. 14) located at the rear of the pump assembly 800 to the nozzles 801.

Valve lubrication

The first or lubricating system also includes a passageway system for carrying lubricating oil to the exteriors of the pump pistons 826.

The oil for this lubricating system is pumped by the oil pump 157 (see Fig. 2) and carried up to the "pump" portion of the machine by an oil line 857 (see Fig. 16) that is threaded into the rear of the cylinder block 828. A drilled oil passageway 858 crosses the block 828 and is connected by short holes 859 in each of the sleeves 827 to the exterior surfaces of the pistons 826. The other end of the oil passageway 858 intersects a vertical lead 860 in the block 828 that in turn intersects a horizontal lead 861 (Fig. 15) which carries oil horizontally to the V-block 848 and is in line with a lead 862 drilled through the V-block 848 that leads upwardly to the surface 855 of the block 848. The lead 862 terminates in a slot 862a that is in line with a short horizontal portion 863 (see Fig. 20) of a surface groove 864 cut in the inclined face 846 of the sliding valve block 195 (see Fig. 23). The groove 864 extends along almost the entire length and width of the face 846 and returns in a substantially straight portion 865 to a position above the short straight portion 863 of the groove 864. The end of the portion 865 connects with a substantially vertical lead 866 (Fig. 26) drilled through the sliding valve block 195 and leading to its upper surface 843 (see also Fig. 19). The upper end of the vertical lead 866 is connected to a surface groove 867 cut in the top surface 843 of the sliding block 195 that leads to the left end of the block (Fig. 19) and connects with a sub-surface lead 868 (see also Fig. 21) extending across the block 195 and connecting with a surface groove 869 that returns on the top surface 843 to the right side of the sliding valve block 195. At the right end of the surface groove 869 the groove connects with a second substantially vertical lead 870 (see also Fig. 26) which at its lower end communicates with the right end of a surface groove 871 (see Fig. 21) similar to the groove 865 but cut in the opposite face 845 of the sliding valve block 195. The groove 871 leads to the left end of the surface 845 where it is connected to a return groove 872 that returns the oil to the right end of the sliding valve block 195 and communicates with a return duct 873 (see Figs. 15 and 27) drilled in the V-block 848. The return duct 873 is connected by means of an oil pipe (not shown) to the sump of the pump 157.

The pressure with which the oil pump 157 feeds oil into the input line 857 and thus into the lubricating passageway system just described is calculated so that a balancing pressure will be maintained between it and the medicament or content material to be encapsulated at the various points where the two systems approach each other. The danger of intercommunication between the two systems is principally present along the interfaces between the sliding valve block 195, its stationary V-block 848 and the stationary cap plate 851. The danger also exists around the pistons 826 and sleeves 827 of the substance pumping cylinders. Because of the difficulty in maintaining a perfect balance between the pressures present in the two fluid systems, it is most advantageous to employ an edible vegetable or mineral oil for the lubricating system just described. Thus, if some of the oil does in fact enter the substance transmittal system it will not deleteriously affect the substance being encapsulated and will do no damage if taken internally with the capsules. Experience has shown that a sufficient closeness of balance can be maintained between the two systems to prevent the entrance of more than a tolerable amount of edible lubricating oils into the substance discharge system. The provision of a thin film of this lubricating oil between the sliding faces of the valve block 195, V-block 848 and cap 851 results in the valve block "floating" as it were and maintaining a good seal between the various passageways.

The lubricating system also is so designed that most of the excess lubricating oil which may escape from between the sliding and stationary valve parts or the pistons and their cylinders will escape exteriorly of these parts and will drip down into a sump 874 formed by the various sections of the main pump housing, for example, the side walls 875 and 876 (Fig. 15), the rear wall 812 and the front wall 877 (Fig. 14). The four walls 875, 876, 812 and 877 form the sump 874 for the purpose of maintaining a bath of machine oil (not shown for purposes of clarity) for the lubrication of the several machine parts such as the cam 187, abutments 805—806, gears 190—191, cam 193, clutch 833, etc. After a considerable length of time during which a small amount of the lubricating oil employed for lubricating the valve elements has dripped into the machine oil maintained in the sump 874, the sump is drained by means of a plug located at its lowermost point (not shown) removing the spent valve lubricating oil and the diluted machine oil as well.

Substance valving

The second and more important passageway system which is provided in the sliding valve block 195, the stationary V-block 848 and the cap 851 is that by means of which the substance being encapsulated is valved from the tank 856 to the pump cylinders 827 and from the pump cylinders 827 alternately to the banks of nozzles 801.

Figures 23, 24, 25:
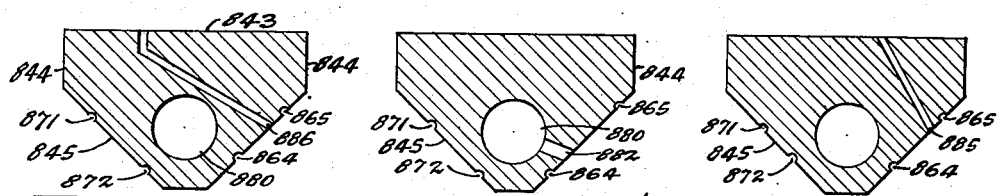
Fig. 23 is an enlarged vertical sectional view taken substantially on the line 23—23 of Fig. 20.
Fig. 24 is a view similar to Fig. 23 but taken on the line 24—24 of Fig. 20.
Fig. 25 is another similar view taken on the line 25—25 of Fig. 20.
Figure 26:
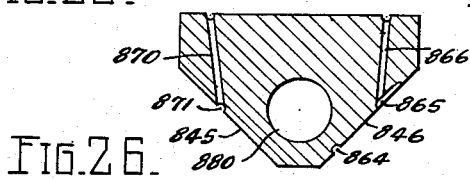
Fig. 26 is a fourth vertical sectional view, taken on the line 26—26 of Fig. 20.

The substance valving system comprises the following elements. The tank 856 which, as explained is mounted at the upper rear portion of the pump housing, has a bottom opening 878 which is in communication with a vertical intake opening 879 bored near the rear of the sliding valve block 195. The intake opening 879 intersects a large diameter horizontal intake bore 880 extending substantially throughout the length of the valve block 195 and plugged at its rear end by a threaded plug 881 (Fig. 14). The intake bore 880 is intersected at spaced distances corresponding to the spacing between the pump sleeves 827, by short downwardly inclined passageways 882 (Figs. 15 and 24). The short passageways 882 are in line with passageways 883 of the same diameters and inclination that are drilled through the left side of the stationary V-block 848 and that lead directly to the ends of the pump sleeves 827. The passageways 882 in the sliding valve block 195 and the passageways 883 in the stationary V-block 848 are axially in line when the sliding valve block 195 is at its centermost position, i. e., when the actuating roller 194 of the block 195 is engaged in the "intake" surfaces 836 and 838 of the cylindrical cam 193.

The timing of the movement of the valve block 195 and of the movement of the piston yoke 825 and thus the pistons 826, is such that the valve block 195 is in the central position at the start of the actuation of the pistons 826 for their intake stroke. The sliding valve block 195 is maintained in this position during the entire intake stroke of the pistons 826 and is not moved until the piston stroke is completed.

Also in communication with the ends of the sleeves 827 are a series of upper passageways 884 which are drilled in the left side of the stationary V-block 848 above the intake passageways 883 already described. The upper ends of the passageways 884 are in line with the lower ends of two series of discharge passageways 885 (Fig. 25) and 886 (Fig. 23) drilled through the sliding valve block 195. As can more easily be seen by examining Figs. 19 and 20, the passageways 885 and 886 are alternately arranged along the sliding valve block 195 although their lower ends (Fig. 20) all lie in the same horizontal line and are in line with the inner ends of the passageways 884 (Fig. 28) with which they alternately are placed in communication. It should also be noted that the ends of the intake passageways 882 are located between successive pairs of the passageways 885 and 886 with a passageway 885 located at the right of each of the passageways 882 and a passageway 886 located at its left.

The arrangement and location of the passageways 882, 885 and 887 corresponds to the relationships between the actuating surfaces of the cam 193 (see Fig. 18).

In operation, after the pump pistons 826 have been moved through their intake stroke, depending upon the position in the cycle of the cam 193, either the "exhaust right" surface 835 or the "exhaust left" surface 837 is next in sequence. The roller 194 entering the "exhaust" surface drives the sliding valve block 195 either to the left of its stroke or to the right as the case might be. If the sliding valve block 195 is driven to the left of its stroke the passageways 885 are immediately placed in line with the passageways 884 in the V-block 848 and maintained in line therewith while the exhaust stroke of the pistons 826 forces the substance out of the sleeves 827 and through the passageways 884, 885 and to the ends of associated vertical passages 887 in the cap plate 851 and (for example) into the ends of nozzle lines 888 (in the group of pump leads 802) for the "left" or odd numbered bank of nozzles 801, corresponding to the row "A" of die pockets (Fig. 28) for the purpose of filling the pockets 547 (see Fig. 5) in the sheet of capsulating material 303 in such pockets.

After the next successive "intake" stroke which takes place as described above, the sliding valve block 195 is moved to the right, bringing the ends of the passageways 886 in line with the passageways 884 in the V-block 848 and holding them there until the pump pistons again discharge their measured quantities of substance through the passageway 884 in the V-block 848, the passageways 886 in the sliding valve block 195 and passages 889 in the cap plate 851 which are in communication with the lowermost ends of nozzle lines 890 (also in the group of flexible pump leads 802) that are connected to the even numbered nozzles 801 in the bank of nozzles for filing the next successive axial row of pockets 547, for example in the row "B" (see Fig. 30).

Both of the sets of nozzle lines 888 and 890 are secured to the upper surface of the cap plate 851 by blocks 891 (which form the manifold 803—see Figs. 14 and 15) in each of which are connected a pair of nozzle lines 888 and 890 that are alternately connected to a single one of the pump cylinder exhaust lines 884.

Nozzle operation

The flexible pump leads 802 comprising the nozzle lines 888 and 890 lead downwardly from the pump to the rear ends of the nozzles 801 (see Fig. 5). The nozzles 801, as mentioned earlier, are associated in two banks, i. e., the odd numbered nozzles, for example, in the "Row A" of Fig. 30 and the even numbered nozzles, for example, in the "Row B" of Fig. 30, the nozzle line 888 is connected to one of the banks and the nozzle line 890 is connected to the other bank.

Figure 7:
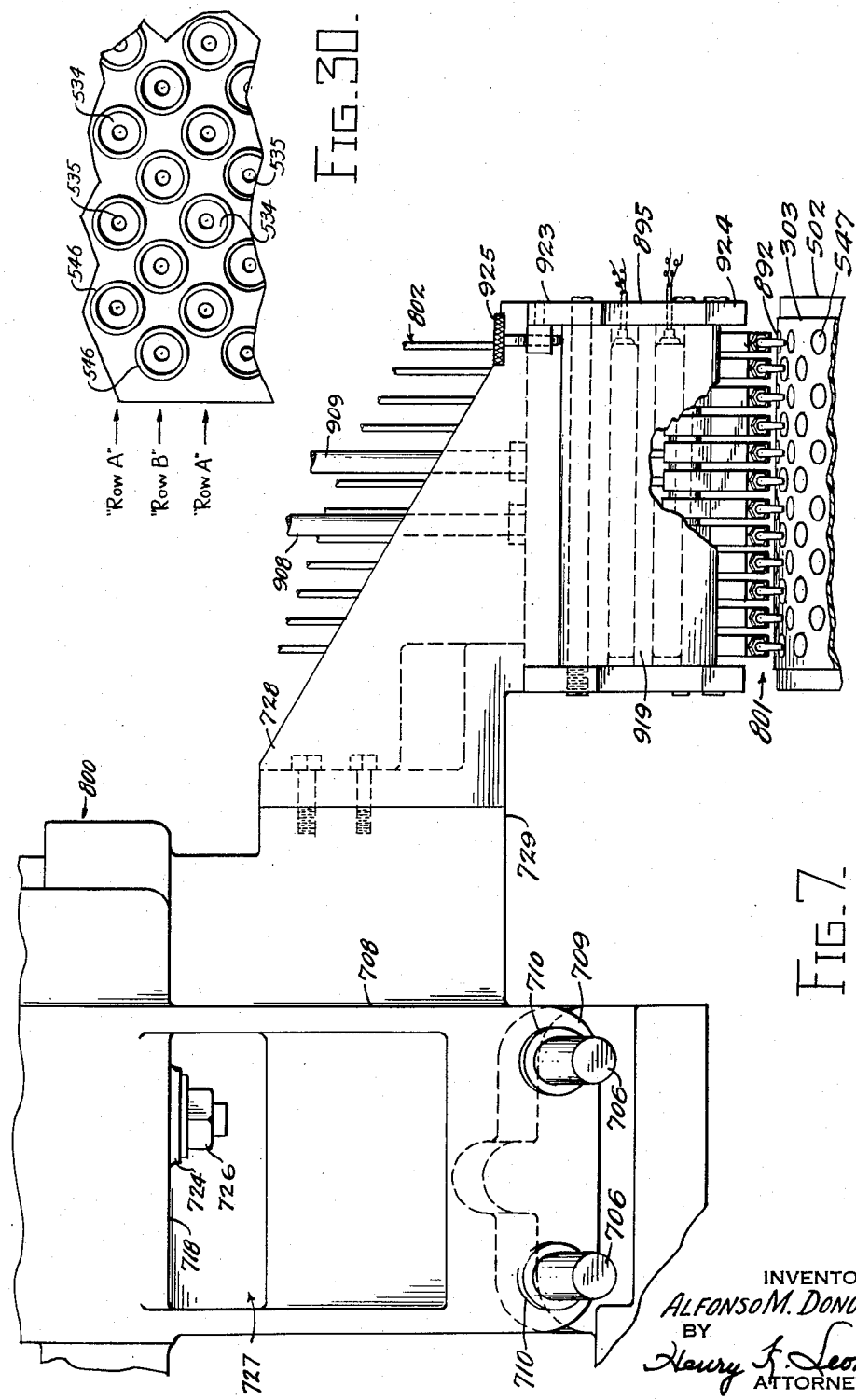
Fig. 7 is a fragmentary view in elevation taken generally from the position indicated by the line 7—7 of Fig. 5.

Each of the nozzles 801 consists in a downwardly turned spout 892 (see Figs. 5, 7 and 29).

which is positioned in the forward end of a rocking block 893. The block 893 is pivoted on a pin 894 extending parallel to the axis of the die roll 502 between a pair of spaced plates 895 that are secured at the front and back of the bracket 728 (see Figs. 5 and 7). Each of the nozzle blocks 893 has a longitudinal bore 896 (Fig. 29) near the forward end of which there is positioned a cone socket valve seat 897 which cooperates with a ball check 898 to form a one way valve that is opened by pressure back of the ball and controlled by the force of a small spring 899 that urges the ball against the cone seat 897. At the rear of each of the blocks 893 the corresponding one of the nozzle lines 888 or 890 is connected.

The two banks of nozzles corresponding to alternate and intervening rows of the die pockets 534 alternately are tilted to depress the ends of their spouts 892 into the corresponding ones of the pockets 547 that are formed in the gelatin sheet 303. This operation and its timing relative to the rotation of the die roll 502 can best be seen by referring to Figs. 33–36 inclusive. As the particular one of the pockets 547 in question approaches a position beneath the end of a spout 892, and its leading edge passes therebeneath, the end of the spout 892 is swung downwardly into the pocket, adjacent its leading edge, just prior to the commencement of the exhaust stroke corresponding to the bank of nozzles depressed and row of capsule pockets being filled. This condition is shown in Fig. 33. The end of the spout 892 is held down in the pocket 547, beneath the level of its upper rim during discharge of substance from the spout. The level of the substance rises until it is above the level of the lowermost end of the spout 892. This condition is shown in Fig. 34.

As the end of the discharge stroke of the pump is reached, one of the short abrupt cam surfaces 839 (Fig. 18) strikes the cam follower 194. At this instant, there simultaneously occur the following things:

(a) The end of the discharge or exhaust stroke of the pump lowers the pressure in the nozzle line 888 or 890 and the ball check 898 closes.

(b) The end of the spout 892 is lifted from beneath the surface of the substance in the pocket 547.

These two events cause the substance to be drawn out into a thread, as shown in Fig. 35. The "thread" of material then "snaps," leaving a droplet on the end of the nozzle, as shown in Fig. 36. This method of terminating the discharge of the substance results in a precise measured charge since for any given substance under constant time and temperature conditions, the size of the droplet remains constant in successive fillings. The quick severance of the "thread" prevents the substance from "stringing" over the edges of pockets which would leave substance on the gelatin in the sealing area of the lips 546 of the die pockets 534 and cause imperfectly sealed capsules, called "leakers" in the trade.

The mechanism for rocking the nozzles 801 is driven by the valve cam 193 already described and consists in the following parts. A yoke 900 (Figs. 14 and 31) is pinned on the upper end of the cam follower pin 841 and pivotally connected to a link 901 which extends to the right (Fig. 14) and is pivotally connected to the lower end of a crank arm 902. The crank arm 902 is secured on the end of a horizontally extending rock shaft 903 that is mounted in a block 903a and on the opposite end of which there is secured a "walking beam" 904 that has two horizontally protruding actuating pins 950, one in each of its arms. The pins 905 extend horizontally between upper and lower collars 906 and 907 that are pinned on each of a pair of vertically extending rods 908 and 909. A coiled spring 912 (Fig. 14) is positioned around each of the rods 908 and 909 between the lower surface of a forwardly extending plate 913 by which the block 903a and the mechanism is supported and collars 914 that are pinned to the rods 908 and 909.

The lower ends of the rods 908 and 909 (Fig. 5) are secured to cross tie bars 910 and 911. The tie bars 910 and 911 are each secured to one of a pair of parallel and adjacent vertically sliding plates 915 and 916 which have slots near their lower edges through which the rear ends of the nozzle bars 893 protrude. All of the odd numbered nozzle bars 893, for example, are drivingly linked to the plate 915 through the medium of upper and lower pins 917 and 918 that are set in the plate 915 and that bear against upper and lower surfaces of the nozzle bars 893. Other upper and lower pins 917 and 918 are similarly secured in the plate 916 and bear against the upper and lower surfaces of the nozzle bars 893 of the even numbered nozzles.

As the cam 193 rotates and the cam follower pin 194 oscillates, the pin 841 pulls the link 901 back and forth. This action rocks the crank 995 oscillating the shaft 903 and the "walking beam" 904. The collars 906 and 907 are vertically spaced from each other a distance substantially greater than the vertical diameter of the pins 905. Thus as the walking beam 904 is oscillated in one direction it lifts the corresponding one of the rods 908 or 909 in turn lifting the associated one of the plates 915 or 916 and tilting the even or odd numbered bank of nozzles to depress the spouts 892 thereof into the corresponding axial row of pockets 547 in the gelatin sheet 303.

After the exhaust stroke of the pump pistons is completed, the cam 193 has rotated to the successive "intake" surface, and the "walking beam" 904 is returned to the neutral position shown in Fig. 14, the corresponding one of the springs 912 driving the associated rod 908 or 909 downwardly and lifting the spouts 892 of the connected bank of nozzles.

As the cam continues to rotate and the pump reaches the next "exhaust stroke" the oscillation of the walking beam 904 (Fig. 14) in the opposite direction takes place. This lifts the other one of the vertical rods 908 or 909 and depresses the other bank of nozzles 801 placing their spouts 892 in the corresponding pockets in the gelatin 303.

Because of the space between the collars 906 and 907, the rods 908 and 909 are not alternated in position but are retained in their neutral position shown in Fig. 14 by the action of the springs 912 until each is positively lifted and held up during the "exhaust stroke" of the pump pistons when the pistons are connected to the bank of nozzles raised by the particular rod 908 or 909. This insures that the lowermost ends of all of the spouts 892 will be elevated above the level of the upper surface of the sheet of gelatin 303 while the die roll 502 is rotating between pockets and while the pump is in an "intake stroke."

Associated with the nozzles 801 are two electric heaters 919 and 920 (Fig. 5). Each of these heaters has an arcuate surface 921 or 922 which is engaged with the surface of the gelatin sheet 302 or 303 respectively. Each of the heaters 919 or 920 is tiltingly mounted in arms 923 or 924 respectively of the spaced plates 895 and can be swung more or less tightly against the surface of the gelatin 302 or 303 by the use of one of a pair of thumb screws 925 or 926, as the case might be. The heaters 919 or 920 engaging the surface of the gelatin sheet just prior to pocketing, filling and sealing render these surfaces more tacky and facilitate their sealing to each other.

Valve cam clutch

As has already been mentioned, the cam 193 is driven from its shaft through the medium of a clutch 833 (see Figs. 14, 17 and 38). The shaft 192 of the cam 193 consists in a sleeve 927 which is rotatably mounted on an axle pin 928 that is studded in a socket 929 in the pedestal 829 and is positioned in the front wall 877 of the pump housing by a retaining screw 930. The sleeve 927 is journalled against axial movement by a pair of thrust bearings 931, one of which is located at each end of the sleeve. The cam 193, in addition to its cylindrical portion in which the track 834 is cut, also has a flange-like section 932 that is spaced from the cylindrical portion of the cam by a section 933 of reduced diameter. A rectangular sliding clutch key 934 slides in a slot 935 that is milled in the side of the reduced diameter portion 933 and extends through the cylindrical portion of the cam 193 parallel to its axis. The key 934 has a beveled sided cutout 936 in its outer side for the admission of the generally knife shaped end 937 of a clutch actuating finger 938. The clutch actuating finger 938 is pinned on a short shaft 939 mounted for oscillation in a pillar 940 and the front wall 877 of the pump. The outer end of the short shaft 939 mounts a lever 941 on the upper end of which there is located a spring pressed locking pin 942 that is releasable by pulling a thumb knob 943.

A spring 944 backs up the clutch key 934 urging it to the left in Fig. 14 toward the bevel gear 191 that is located adjacent the side face of the cylindrical portion of the cam 193 and on the opposite side thereof from the clutch mechanism mentioned. A socket 945 that is cut in the face of the gear 191 has a generally triangular shape with an angular extent of approximately 30° on the face of the gear (compare Figs. 14 and 38). The socket 945 has radial walls that lie in planes parallel to the axes of the pin 928 and sleeve 927 and an outer circumferential wall spaced sufficiently far outside the axis thereof to form a shallow socket for the end of the key 934. The drive is disconnected by swinging the finger 938 upwardly into the position shown in Fig. 14. This places the inclined end of the knife edge 937 of the finger 938 in line with the cutout 936 and when the cam 193 rotates, the inclined surface of the cutout 936 strikes the inclined surface of the finger 938, camming the key 934 backwardly and removing its end from the socket 945 of the gear 191. The angular relationship between the key 934, the surfaces of the cam track 834 and the location of the knife edge 937 of the clutch finger 938 with respect thereto, is such that upon the engagement between the finger 938 and key 934 the cam follower 194 is engaged in one of the two "intake surfaces" 836 or 838 of the cam track 834.

Thus, whenever the clutch 833 is declutched by swinging the lever 941 upwardly into the position shown in Figs. 14, 17 and 38, the cam 193 is stopped in the "intake" position and thus the sliding valve block 195 is stopped so that the intake passageways 882 therein are in line with the intake passageways 883 in the stationary V-block 848. Therefore, in order to stop the discharge of substance from the nozzles 801, for example to make adjustments in the machine, it is not necessary to stop the pump itself. The pistons continue to operate and keep the substance that is in the passageways 878, 880, 882 or 883 in motion, pulling it into those passageways during the intake stroke of the pump pistons 826 and forcing it back through those passageways during the discharge strokes of the pistons 826. Such an occurrence is common because it frequently is necessary to stop the rotation of the die roll 502, because of breaks or other faults in the sheets of gelatin 302 or 303, in which instance, it is also necessary that the nozzles 801 be lifted so that their spouts shall not be depressed into the pockets 547 and that no substance be discharged from the spouts 892 during this stopping of operation. If the pump did not stop with its sliding valve block 195 in "neutral," as it were, i. e., with the intake passageways connected, it would either be necessary to stop the operation of the pump pistons as well as the operation of the sliding valve block 195 and the nozzles 801 or substance would be discharged from the nozzles and wasted and the substance in the intake lines of the pump might well congeal or solidify.

POWDER FILLING MECHANISM

Figure 40:
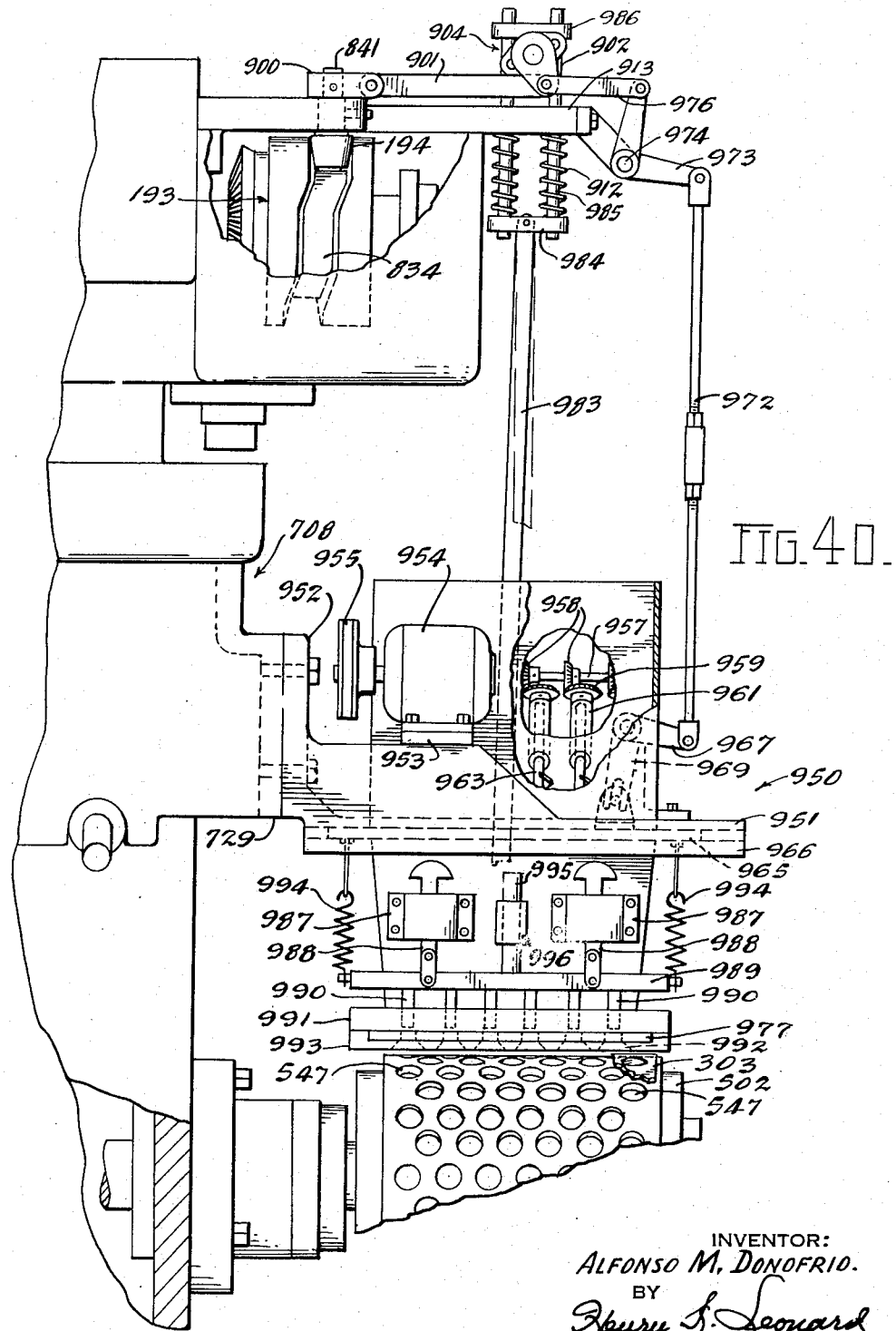
Fig. 40 is a view taken from the left side of Fig. 37, also with parts broken away.

A powder filling mechanism is generally indicated in Figs. 39 and 40 by the reference number 950. The mechanism 950 is mounted on the front of the machine and above the die roll 502 in place of the nozzle bracket 728 and mechanism supported thereby for carrying and actuating the banks of nozzles 801. The powder filling mechanism 950 is supported on a horizontally extending frame plate 951 which has an upwardly extending arm 952 that is bolted to the pad 729 in place of the nozzle bracket 728 (see Fig. 7).

The plate 951 is a portion of a general casting which also includes the arm 952 and a pedestal 953 on which an actuating motor 954 is supported. The motor 954 drives a belt 955 which is engaged in a main driving pulley 956 that is secured on the rear end of a shaft 957 extending horizontally parallel to the axis of the die roll 502 and journalled in front and rear plates (not shown) of the powder filling mechanism 950. A plurality of bevel pinions 958 are pinned on the shaft 957 at spaced points along its length. In the embodiment of the invention shown in the drawings there are six of the pinions 958, each corresponding to one of the pockets 534 in a single axial row of pockets in the die roll 502.

Each of the pinions 958 is in mesh with a similar bevel pinion 959 pinned on the upper end of an inclined auger shaft 960 rotatably mounted in a bearing sleeve 961 formed on the rear wall of a hopper 962. Each of the shafts 960 has an auger 963 formed at its lower end which extends downwardly to the bottom of the hopper 962 along its inclined rear wall 964.

The hopper 962 has a pair of flat, spaced gibs 965 and is mounted to slide in channels 966 of the plate 951. The hopper 962, augers 963, shaft 957 and driving pulley 956 are all shifted from front to back of the machine (from right to left in Fig. 40) by a bell crank 967 pivotally mounted in a post 968 that is erected upon the stationary plate 951. A downwardly extending arm 969 of the bell crank 967 is bifurcated and engages a pin 970 that is secured in an ear 971 mounted on the gib 965. The other arm of the bell crank 967 is linked to the lower end of a vertically extending pull rod 972, the upper end of which is connected to the forward arm of a bell crank 973. The bell crank 973 is pinned on a horizontal rock shaft 974 which is supported by a sleeve 975 mounted on the forward end of the plate 913 (referring back to Figs. 14 and 31). The other arm of the bell crank 973 is connected by a link 976 to the lower end of the crank arm 902 already described with reference to Figs. 14 and 31 above.

At the lower end of the hopper 962 there is located a horizontal, sliding, charging plate 977 (Fig. 39) which forms a bottom closure for the hopper 962 and which has a spaced row of apertures 978 extending along a line parallel to the axis of the die roll 502 and spaced center to center a distance corresponding to the spacing of the die pockets 534 in a single axial row of die pockets. The charging plate 977 is reciprocated horizontally in a direction perpendicular to the reciprocation of the entire hopper 962, by a bell crank 979 which is connected by a link 980 to the charging plate 977 and rockingly mounted by a bracket 981 supported on a stationary portion of the filling mechanism 950. A horizontally extending arm 982 of the bell crank 979 is connected through a lost motion connection to the lower end of a vertical pull rod 983. The upper end of the pull rod 983 is pivotally connected to a cross arm 984 that is secured to the lower ends of a pair of vertically extending slide rods 985 which correspond to, and are mounted in place of, the vertically extending pull rods 908 and 909 of the liquid and semi-liquid filling mechanism disclosed in the earlier drawings and particularly in Figs. 14 and 31. The upper ends of the pull rods 985 are provided with spaced tie plates 986 that are engageable by the pins 905 of the "walking beam" 904. The walking beam 904, as described above, is rockingly actuated through the medium of the link 901 by the engagement of the cam follower 194 in the track 834 of the rotary valve actuating cam 193.

A pair of solenoids 987 are mounted on the front wall (left wall—Fig. 39) of the hopper 962 near its lower end with their core rods 988 linked to a cross bar 989. Six short ejector rods 990 are studded in the bar 989 and vertically slidable through a guide bar 991 beneath which the forward (left—Fig. 39) edge of the charging plate 977 slides. The ejector rods 990 are coaxial with corresponding flared openings 992 formed in a horizontal plate 993 located beneath the guide bar 991 and spaced therefrom. The plate 993 is located beneath and forms the bottom supporting slide for the charging plate 977.

The plate 993 is spaced only slightly above the upper surface of the die roll 502 with merely sufficient clearance to allow the sheet of gelatin 303 to pass beneath the plate 993 without actual contact.

Operation

In common with the operation of the mechanism for actuating the banks of nozzles 801 which are alternately lifted to fill successive axial rows of pockets 547 in the corresponding die pockets 534, the powder filling mechanism 950 alternately is shifted to position the openings 992 above the pockets 547 in successive staggered rows in the die roll 502.

It will be recalled that the cam track 834 of the pump valve cam 193 (see Fig. 18) has alternate "exhaust right" and "exhaust left" surfaces with intervening "intake" surfaces, numbers 835, 837 and 836, respectively. When the powder filling mechanism 950 is being used, the pump volume control is so set as to result in no substance being taken into and discharged from the pump pistons and the pump valve cam 193 is relied upon solely to actuate the "walking beam" 904 and the bell crank 973.

Energization of the motor 954 rotates the augers 963 at a relatively high rate of speed, thus forcing downward and throwing pulverulent materials such as powder, small granules, etc. toward the bottom of the hopper 963. Because of the timing relationships already described between the rotation of the die roll 502 and the pump valve cam 193, the bell crank 973 is rocked and, through the medium of the pull rod 972, rocks the bell crank 967, thus sliding the hopper 962 on its gibs from front to back (left to right in Fig. 40) corresponding to the surfaces of the cam track 834. The linkage described so times the actuation of the bell crank 967 that the mechanism is shifted to the far side just prior to the rocking of the walking beam 904 which pulls upwardly on the pull rod 983 and slides the charging plate 977 to the left (Fig. 39).

The apertures 978 in the charging plate 977 having been filled with powder by the downward thrust of the augers 963 during the previous "intake" or intervening position, as the charging plate 977 moves to the left its apertures 978 are moved out over the openings 992 in the plate 993. If the powder contained in the apertures 978 is not tightly packed, it begins to drift downwardly through the openings 992 and falls into the corresponding pockets 547 in a single axial row of pockets staggered toward that end of the die roll 502 toward which the whole operating portion of the powder filler 950 has just been shifted.

The charging plate 977 moves at the same linear rate of speed as the die roll 502 and thus its loaded apertures 978 move along above the particular axial row of pockets 547 which are being filled. As the powder drifts downwardly through the openings 992 it falls only in those pockets in which it is intended to fall.

On the other hand, if the powder is tightly compacted in the apertures 978 and thus none drifts downwardly as soon as these apertures commence to move over the open upper ends of the openings 992, or, in any event, as soon as the charging plate 977 is driven to the far end of its travel and its apertures 978 are concentric with the openings 992, it also is concentric with and beneath the lower ends of the ejector rods 990. At this instance, through the control of a microswitch (not shown), the solenoids 978 are energized, driving the cross bar 989 downwardly and thrusting the ejector rods 990 through the guide bar 991 into the apertures 978 and ejecting either the entire "slug" of compacted powder in the apertures 978 or such remaining bits of powder as may not previously have drifted downwardly, through the openings 992 and into the pockets 547 in the axial row of pockets above which the mechanism is positioned. The actuation of the solenoids 978 is only momentary and thus the ejector rods 990 are immediately withdrawn from the apertures 978 by return springs 994. The movement of the bar 989 is guided by a guide pin 995 which slides in a guide 996 mounted between the solenoids 978.

The walking beam 904 then is returned to its central position by the engagement of the cam roller 840 with an "intake" surface of the cam 193 and the springs 912 (which surround the vertically extending rods 985) drive the vertical pull rod 983 downwardly rocking the bell crank 979 and returning the sliding charging plate 977 to the right (Fig. 39). The augers 963 then force powder downwardly, again loading the apertures 978 in the plate 977. The rotating valve cam 193 continues to rotate and its opposite "exhaust surface" is engaged, which rocks the bell crank 973 in the opposite direction to that already described. This shifts the hopper 962 and associated parts axially of the die roll 502 toward its other end and lines up the ejector rods 990 and openings 992 with a successive axial row of capsule pockets 547 that are staggered in the opposite direction.

The cycle above described repeats for each of the axial rows of pockets 547 with the powder filling mechanism being shifted bodily axially of the die roll 502 to position the openings 992 above the pockets 547 in successive axial rows and with the sliding charging plate 977 being reciprocated in timed relation thereto from the right position where powder is fed into the apertures 978 to the left where it falls into the pockets 547 in the row selected by the alternate positions of the entire mechanism to deliver charges of powder through the openings 992 and beneath the ejector rods 990 for loading into the staggered successive rows of pockets 547.

The mechanisms earlier described for adjusting relative timing between substance deposition and die roll rotation are equally operable for the control of these phases of the powder filling operation. In addition adjustment of the precise instant of deposition, etc., may be made by adjustments of the pull rods, bell cranks, yokes, etc., constituting parts of the mechanism.

It has been found that powdered and granulated materials transmit force in a manner almost identical to that in which forces are transmitted by liquids. The term "hydrostatic force" is employed throughout this specification to indicate that the force transmitted is not mechanical in nature (i. e., a transmitted force equal in total to the input force), but rather to indicate that the force transmitted through the substance in question is multiplied on a ratio equal to that between the areas over which the force acts. This form of force transmission is true of liquids, semi-liquids and pastes and also of powders, crystalline materials, granules, etc., although in the latter three cases some losses due to friction between the particles is encountered.

The transmission of force by the pulverulent materials is, however, sufficiently "hydrostatic-like" that when the pocketed sheet of gelatin 303 is covered with the covering sheet of gelatin 302 and the vacuum on the underside of the die pockets 534 is released, the greater stresses existing in the pocketed sheet 303 due to prior history or merely to pocketing, transmit force through the pulverulent substance and are balanced by reducing the extent of bulging of the pocketed sheet 303 and bulging the previously flat sheet 302 to form symmetrical capsules with parting lines lying generally along their median plates. As in the cases of liquids and pastes (as is more particularly described and claimed in my Patent No. 2,513,852) pockets of different shapes may be employed with powders also.

The operation of a machine embodying the invention for the filling of capsules with pulverulent material through the use of the powder filling attachment just described, with the exception of details of the actual filling mechanism, is identical with the operation already described for the filling of capsules with liquids, semi-liquids or pastes.

In the claims which follow, therefore, the phrase "materials capable of transmitting hydrostatic force" is employed to denominate all substances as discussed above.

Having described my invention, I claim:

1. In a machine for forming capsules having uniform measured charges of substance capable of transmitting hydrostatic force sealed between opposed layers of elastic sheet material, in combination, a die roll having a plurality of axial rows of die pockets cut in its periphery, means for feeding a sheet of material over the periphery of said die roll, means for depressing defined portions of said material into said die pockets for forming substance receiving pockets therein, means actuated through an intake and an exhaust cycle for each axial row of pockets for depositing a measured charge of substance simultaneously into all of said pockets in an axial row as each row of said pockets reaches a predetermined position relative to said depositing means, means for adjusting the timing of said depositing means relative to the position of said row of die pockets relative to said depositing means at the time of deposition of said substance, and means for laying a generally flat and not pocketed second sheet of elastic material over said substance and for sealing said sheets together around the margins of said pockets and for severing said sealed substance enclosing capsules from said sheets and releasing the thus formed capsules from confinement whereby equalization of forces in said sheets resulting from the pocketing of the first sheet reduces the deformation of the pocketed sheet and deforms said second sheet correspondingly.

2. In a machine for forming capsules having uniform measured charges of substance capable of transmitting hydrostatic force sealed between opposed layers of elastic sheet material, in combination, means for continuously feeding two sheets of elastic sheet material along converging paths, means for independently controlling the linear speed of each of said sheets, said means for controlling being so coordinated that the sheet to be pocketed is stretched more than the other sheet, means for deforming defined areas of only one of said sheets to form pockets of definite volume therein prior to convergence with the other of said sheets, means for depositing a measured charge of substance into each of said pockets in said material as each pocket reaches a predetermined position relative to said depositing means, means for varying the timing of the operation of said depositing means for changing the position relative to the pockets at which said depositing means is actuated, means for sealing together said sheets and cutting out around the margins of said pockets, upon convergence of the sheets, to form closed substance containing capsules, and means for separating said capsules from said sheets and releasing the capsules from confinement whereby equalization of forces in said sheets reduces the deformation of the pocketed sheet and deforms the other sheet correspondingly.

3. In a machine for forming capsules having uniform measured charges of substance capable of transmitting hydrostatic force sealed between opposed layers of elastic sheet material, in combination, means for continuously forming and feeding two sheets of elastic sheet material along converging paths at linear speeds independently variable relative to each other for introducing controlled linear stress into said sheets, said means for forming and feeding being so coordinated that the sheet to be pocketed is stretched more than the other sheet, means for deforming defined areas of only one of said sheets to form pockets of definite volume therein prior to convergence with the other of said sheets, means for depositing a measured charge of substance into each of said pockets in said material as each pocket reaches a predetermined position relative to said depositing means, means for varying the timing of the operation of said depositing means for changing the position relative to the pockets at which said depositing means is actuated, means for sealing together said sheets and cutting out around the margins of said pockets, upon convergence of the sheets, to form closed substance containing capsules, means for progressing said sheets at the same linear speed, and means for separating said capsules from said sheets and releasing the capsules from confinement whereby equalization of forces in said sheets reduces the deformation of the pocketed sheet and deforms the other sheet correspondingly.

4. In a machine for forming capsules having uniform measured charges of substance capable of transmitting hydrostatic force sealed between opposed layers of elastic sheet material, in combination, means for continuously feeding two sheets of elastic sheet material along converging paths, means for independently controlling the linear speed of each of said sheets, said means for controlling being so coordinated that the sheet to be pocketed is stretched more than the other sheet, means for deforming defined areas of only one of said sheets to form pockets of definite volume therein prior to convergence with the other of said sheets, means for depositing a measured charge of substance into each of said pockets in said material as each pocket reaches a predetermined position relative to said depositing means, means for varying the timing of the operation of said depositing means for changing the position relative to the pockets at which said depositing means is actuated, means for sealing together said sheets and cutting out around the margins of said pockets, upon convergence of the sheets, to form closed substance containing capsules, means for separating said capsules from said sheets and releasing the capsules from confinement whereby equalization of forces in said sheets reduces the deformation of the pocketed sheet and deforms the other sheet correspondingly, and means for feeding said sheets at a linear speed in excess of the speed at convergence, sealing and severance whereby the holes therein formed by severing said capsules therefrom are elongated and pulled away from said capsules, thereby facilitating removal of said capsules therefrom.

5. In a machine for forming capsules having uniform measured charges of substance capable of transmitting hydrostatic force sealed between opposed layers of elastic sheet material, in combination, means for continuously forming two sheets of elastic material, means for continuously feeding said sheets of elastic sheet material along converging paths at independently controlled linear speeds, means for deforming defined areas of only one of said sheets to form pockets of definite volume therein prior to convergence with the other of said sheets, means for moving said pockets sequentially through a filling position, means for depositing a measured charge of substance into each of said pockets at a controllable time while said pocket is passing through said filling position and comprising means for controlling and varying such time, means for sealing the not-deformed second sheet of material over said pockets and for severing the thus closed capsules from the sheets around the margins thereof, and means for then feeding said sheets at a linear speed in excess of the linear speed thereof at the time of severing for stretching said sheets out of contact with the capsules severed therefrom.

6. Apparatus for forming capsules consisting of measured charges of substance capable of transmitting hydrostatic forces sealed between layers of elastic sheet material, comprising, in combination, means for supplying a continuous sheet of elastic material, means for supplying a second sheet of elastic material, means for controlling the linear speed of said supplying means independently of each other, a die roll having die pockets cut in its periphery, means for rotating said roll at a controlled speed, means for leading one of said sheets over said die roll, means for successively deforming said sheet into said die pockets, means for maintaining a supply of substance to be capsulated, substance feeding means adapted to deposit substance in each of said pockets, substance measuring means for withdrawing a measured charge of substance from said supply maintaining means and for delivering said charge to said feeding means, a positively operated slide valve for placing said measuring means in communication alternately with said supply means and with said feeding means, means for adjusting the operation of said measuring means to conform to the linear speed of said die roll and for varying the timing of said slide valve, means for laying the second sheet of material over the pockets when filled and for sealing said sheets of material around the margins of said pockets and severing the thus formed capsules from said sheets of material.

7. Apparatus for forming capsules consisting of measured charges of substance capable of transmitting hydrostatic forces sealed between layers of elastic sheet material, comprising, in combination, means for supplying a continuous sheet of elastic material, means for supplying a second sheet of elastic material, means for controlling the linear speed of said supplying means independently of each other, a die roll having a plurality of axial rows of die pockets cut in its periphery, means for rotating said roll at a controlled speed, means for leading one of said sheets over said die roll, means for successively deforming said sheet into said die pockets, means for maintaining a supply of substance to be capsulated, substance feeding means adapted to deposit substance simultaneously into each of said pockets in each successive axial row when such row reaches the uppermost position on said die roll, substance measuring means for withdrawing a measured charge of substance from said supply maintaining means and for delivering said charge to said feeding means, a positively operated slide valve for placing said measuring means in communication alternately with said supply means and with said feeding means, means for adjusting the operation of said measuring means to conform to the linear speed of said die roll and for varying the timing of said slide valve, means for laying the second sheet of material over the pockets when filled and for sealing said sheets of material around the margins of said pockets and severing the thus formed capsules from said sheets of material.

8. Apparatus in accordance with claim 7 in which the slide valve is driven through a clutch that includes a disengaging element operable only when said slide valve is in position to place said measuring means in communication with said supply means.

9. Apparatus according to claim 7 in which the means for controlling the linear speed of said sheet material supplying means consists in a separate power train comprising speed change mechanism for each of said sheet material supplying means and in which a third power train having phase changing mechanism drives said die roll and actuates said substance measuring means, said slide valve and said feeding means in variable timed relation to the rotation of said die roll.

10. In a capsule forming machine that has a single die roll having at least one circumferentially extending row of die pockets and that rotates on a horizontal axis, means for feeding a continuous sheet of elastic material over said die roll, means for deforming said material into said die pockets at the top of said die roll to form upwardly open, substance receiving pockets of volume determined by said die pockets, and means for laying and sealing a second sheet of elastic material over said pockets; apparatus for the measurement and deposition of substance capable of transmitting hydrostatic force into said pockets that comprises a substance chamber equal in volume to a capsule to be formed, means for filling and exhausting said chamber in timed relation to the rotation of said die roll, substance depositing nozzles positioned above said die roll in line with said row of pockets, means for moving the tips of said nozzles downwardly to below the level of the top of the substance receiving pockets to deposit substance in successive pockets, means for transferring substance from said chamber to said depositing means operable in timed relation to the rotation of said die roll and controlling said moving means and change mechanism for varying such timed relationships according to the number of die pockets in said row of die pockets.

11. In a machine of the class described, in combination, a die roll having alternately staggered axially extending rows of die pockets, the center lines of adjacent axial rows being spaced circumferentially less than the diameter of one of said pockets and the die pockets in alternate rows being in line circumferentially, a group of substance depositing means mounted above said die roll, there being an individual means for each pocket in an axial row of pockets, a substance supply, a substance measuring means associated with each of said substance depositing means, mechanism driven in timed relation to the rotation of said die roll for placing said measuring means alternately in communication with said supply and with its associated depositing means; means to align the individual substance depositing means with the individual pockets in an axial row at the time of substance deposition; further mechanism also driven in timed relation to the rotation of said die roll for actuating said substance depositing means as a die pocket passes therebeneath for depositing substance therein and a clutch for controlling both of said mechanism and disengageable only when said substance measuring means is in communication with said supply.

12. In a machine of the class described, in combination, a die roll having alternately staggered axially extending rows of die pockets, the center lines of adjacent axial rows being spaced circumferentially less than the diameter of one of said pockets and the die pockets in alternate rows being in line circumferentially, at least one group of substance depositing means mounted above said die roll, there being an individual means in said group for each pocket in an axial row of pockets, a substance supply, a substance measuring means associated with each of said substance depositing means, mechanism driven in timed relation to the rotation of said die roll for placing said measuring means alternately in communication with said supply and with its associated depositing means; further mechanism also driven in timed relation to the rotation of said die roll for actuating all of said substance depositing means for each axial row of pockets simultaneously as each axial row of pockets passes therebeneath for depositing substance therein and a clutch for controlling both of said mechanisms and disengageable only when said substance measuring means is in communication with said supply.

13. In a machine of the class described, in combination, a die roll having alternately staggered axially extending rows of die pockets, the center lines of adjacent axial rows being spaced circumferentially less than the diameter of one of said pockets and the die pockets in alternate rows being in line circumferentially, at least one group of substance depositing means mounted above said die roll, there being an individual means in said group for each pocket in an axial row of pockets, all of the depositing means for the pockets in each axial row of pockets being actuatable as a bank for simultaneously depositing substance in all of the pockets in each axial row of pockets as such axial row of pockets passes beneath said depositing means, a substance supply, a substance measuring means associated with each of said substance depositing means, mechanism driven in timed relation to said die roll for placing said measuring means alternately in communication with said supply and with its associated depositing means; further mechanism also driven in timed relation to the operation of said die roll for actuating a bank of substance depositing means as each row of die pockets passes therebeneath for depositing substance simultaneously therein and a clutch for controlling both of said mechanisms and disengageable only when said substance measuring means is in communication with said supply.

14. In a machine of the class described, in combination, a die roll having alternately staggered axially extending rows of die pockets, the center lines of adjacent axial rows being spaced circumferentially less than the diameter of one of said pockets and the die pockets in alternate rows being in line circumferentially, a group of substance depositing nozzles pivotally mounted above said die roll, there being a nozzle for each circumferential row of pockets, all of the nozzles for the pockets in an axial row of pockets being actuatable as a bank for movement down into and out of the pockets in an axial row of pockets simultaneously, a pump having a cylinder for each nozzle in a bank of nozzles, a substance supply tank, a pump manifold and a conduit connecting said manifold and said nozzles, a substance valve, means for actuating said valve to place said pump cylinders alternately in communication with said substance supply tank and through said nozzles alternately in communication with successive staggered rows of said pockets, means actuated by said substance valve for pivoting such bank of nozzles when in communication with said pump cylinders to depress the ends thereof into the pockets being filled and a clutch for actuating said valving means, said clutch being disengageable only when said valving means is in position connecting said pump cylinders to said substance supply tank.

15. In a machine of the class described, in combination, a die roll having alternately staggered axially extending rows of die pockets, the center lines of adjacent axial rows being spaced circumferentially less than the diameter of one of said pockets and the die pockets in alternate rows being in line circumferentially, support means adjustably mounted for diagonal motion towards and away from, but generally tangentially to, said die roll, pivot means attached to said support means, the axis of said pivot means being parallel to the die roll axis, a group of substance depositing nozzles mounted on said pivot means above said die roll, there being a nozzle for each circumferential row of pockets, the nozzles for alternate axial rows being associated together operatively as a bank and being alternated in said group with nozzles associated together operatively as a bank for intervening axial rows, all of said nozzles being pivoted for swinging movement down into and out of the pockets in corresponding rows of said pockets, a pump having a cylinder for each nozzle in a bank of nozzles, a substance supply tank, a pump manifold and conduit connecting said manifold and said nozzles, a substance valve, cam means for actuating said valve to place said pump cylinders alternately in communication with said substance supply tank and said manifold and, when in communication with said manifold, alternately with conduit leading to nozzles in one of said banks and with conduit leading to nozzles in the other of said banks, means actuated by said valving means for pivoting that bank of nozzles in communication with said pump cylinders and a clutch for actuating said cam, said clutch being disengageable only when said cam and said valve are in position connecting said pump cylinders to said substance supply tank.

16. In apparatus according to claim 15 the improvement consisting in a drive cam for the substance valve, said cam having a valve actuating track with alternating exhaust surfaces adapted to position the valve for connecting the pump cylinders to the banks of nozzles and intake surfaces intervening between said exhaust surfaces adapted to position the valve for connecting the pump cylinders to the supply tank.

17. In apparatus according to claim 15, a valve comprising a reciprocal valve block, a stationary guide block, an intake passage in said valve block communicating with said supply tank, an intake lead in said valve block and an associated lead in said guide block in communication with said intake passage and a pump cylinder respectively and in line with each other at the central position of said valve block in said guide block, a second lead in said guide block in communication with said pump cylinder, a pair of exhaust leads in said valve block spaced on opposite sides of said intake lead and alternately in line with the second lead in said guide block when said valve block is at opposite ends of its travel, said valve block being actuated in timed relation to said pump cylinder whereby said intake leads are in line during an intake stroke of the piston in said cylinder and said second lead is in line alternately with said exhaust leads during exhaust strokes of said piston.

18. In a capsulating machine adapted to use interchangeable die rolls each with at least one circumferentially extending row of die pockets cut in its periphery, the number of die pockets in a circumferential row depending upon the volume of the capsules to be fabricated, the improvement consisting in substance depositing means including a pump and a spout positioned above and in line with said row of die pockets, a power drive train for rotating said die roll, an output shaft in said power drive train adapted to interchangeably mount gears of different numbers of teeth, a pump input gear mounted on an axis parallel to and spaced from said output shaft, an idler gear meshed with said input gear and revolubly mounted relative thereto whereby said idler gear is adapted to mesh with gears of different numbers of teeth mounted on said output shaft, said pump being thus actuated in sequence relation to the rotation of said die roll determined by the number of teeth on the particular one of interchangeable gears on said shaft and in phase relation to the rotation of said die roll determined by the angular engagement relationship between said idler and the interchangeable gear on said shaft.

19. Pulverulent substance measuring and depositing mechanism for a capsulating machine having only a single rotatable die roll with die pockets in its periphery, means for feeding a sheet of elastic capsulating material over the surface of said roll and means for deforming said sheet material into said die pockets to form substance receiving pockets therein; said mechanism comprising, a hopper, capsule charge measuring means alternately positionable in a first position beneath said hopper and in a second position over one of said capsule pockets, mechanical means for feeding substance from said hopper into said measuring means when in its first position, other mechanical means for ejecting such charge from said measuring means when in its second position into the corresponding one of said capsule pockets and adjustable timing means for reciprocating said measuring means between its positions in timed relation to the rotation of said die roll.

20. Pulverulent substance measuring and depositing mechanism for a capsulating machine having only a single rotatable die roll, said die roll having axially extending, peripherally adjacent rows of die pockets cut in its periphery, the pockets being staggered axially in successive rows, means for feeding a sheet of elastic capsulating material over the surface of said roll and means for deforming said sheet material into said die pockets to form substance receiving pockets therein; said mechanism comprising, a hopper, substance charging means having a measuring element for each of the capsule pockets in an axial row, said charging means being alternately positionable beneath said hopper in substance receiving position and over the pockets in a single axial row in substance exhausting position, means for reciprocating said charging means in timed relation to the rotation of said die roll, means for feeding substance from said hopper into said measuring elements, means for positively exhausting substance from said measuring elements when said charging means is in exhausting position, and mechanism operable in timed relation to the reciprocation of said charging means and the rotation of said die roll for alternately shifting such exhausting position of said charging means axially of said die roll corresponding to the staggering of the pockets in successive rows of said pockets.

21. Pulverulent substance measuring and depositing mechanism for a capsulating machine having only a single rotatable die roll, said die roll having axially extending, peripherally adjacent rows of die pockets cut in its periphery, the pockets being staggered axially in successive rows, means for feeding a sheet of elastic capsulating material over the surface of said roll and means for deforming said sheet material into said die pockets to form substance receiving pockets therein; said mechanism comprising, a hopper, a reciprocating plate mounted to slide beneath the bottom of said hopper and having a row of apertures therethrough, each of said apertures having a volume equal to the volume of a capsule to be formed, the apertures being spaced according to the spacing of the pockets in a single axial row of pockets in said die roll, means for reciprocating said plate in timed relation to the rotation of said die roll between a loading position with the apertures beneath said hopper and an exhausting position with the apertures in line with an axial row of said pockets, substance ejecting means mounted in position to eject substance from the apertures when in such exhausting position and means driven in timed relation to said die roll for shifting said plate and said ejecting means axially of said die roll alternately in opposite directions as said plate reaches exhausting position to place the apertures therein in line with successive, alternately staggered rows of said pockets.

22. In a device according to claim 21, the improvement that consists in means for reciprocating said plate so constructed and arranged that the movement of said plate from substance charging position to substance exhausting position takes place in a plane parallel to a line tangential to the surface of said die roll at exhausting position and in a direction the same as the movement of the row of die pockets to be filled, at and during filling.

ALFONSO M. DONOFRIO.

References Cited in the file of this patent
UNITED STATES PATENTS

| Number | Name | Date |
|---|---|---|
| 2,001,792 | Lombi | May 21, 1935 |
| 2,199,425 | Waring | May 7, 1940 |
| 2,309,545 | Scherer | Jan. 26, 1943 |
| 2,387,747 | Cowley | Oct. 30, 1945 |
| 2,431,141 | Scherer | Nov. 18, 1947 |
| 2,549,327 | Moule | Apr. 17, 1951 |